(12) United States Patent
Tiedemann, Jr. et al.

(10) Patent No.: US 7,751,370 B2
(45) Date of Patent: *Jul. 6, 2010

(54) METHOD AND APPARATUS FOR FORWARD LINK RATE SCHEDULING

(75) Inventors: Edward G. Tiedemann, Jr., San Diego, CA (US); Yu-Chuan Lin, Vancouver (CA); Yu-Cheun Jou, San Diego, CA (US); Joseph P. Odenwalder, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1035 days.

This patent is subject to a terminal disclaimer.

(21) Appl. No.: 11/399,992

(22) Filed: Apr. 7, 2006

(65) Prior Publication Data

US 2006/0203731 A1 Sep. 14, 2006

Related U.S. Application Data

(63) Continuation of application No. 09/905,300, filed on Jul. 13, 2001, now Pat. No. 7,054,293.

(51) Int. Cl.
*H04B 7/216* (2006.01)
*H04J 3/22* (2006.01)

(52) U.S. Cl. .................... 370/335; 370/342; 370/468

(58) Field of Classification Search .................. None
See application file for complete search history.

(56) References Cited

U.S. PATENT DOCUMENTS

| | | | |
|---|---|---|---|
| 3,310,631 A | 3/1967 | Brown | 179/15 |
| 3,715,508 A | 2/1973 | Blasbalg | 179/15 BC |
| 4,135,059 A | 1/1979 | Schmidt | 179/15 BS |
| 4,220,821 A | 9/1980 | Lucas | 370/110 |

(Continued)

FOREIGN PATENT DOCUMENTS

EP 0412583 3/1986

(Continued)

OTHER PUBLICATIONS

European Search Report—European Patent Office 5019889—Munich Dec. 20, 2005.

(Continued)

*Primary Examiner*—Chi H Pham
*Assistant Examiner*—Soon-Dong D Hyun
(74) *Attorney, Agent, or Firm*—Donald C. Kordich

(57) ABSTRACT

In a communication system capable of variable rate transmission, scheduling of high speed data transmission improves utilization of the forward link and decreases the transmission delay in data communication. Each remote station is assigned one primary code channel for the duration of the communication with a cell. Secondary code channels of various types and transmission capabilities can be assigned by a channel scheduler for scheduled transmission of data traffic at high rates. Secondary code channels are assigned in accordance with a set of system goals, a list of parameters, and collected information on the status of the communication network. Secondary code channels can be grouped into sets of secondary code channels. Data is partitioned in data frames and transmitted over the primary and secondary code channels which have been assigned to the scheduled user.

27 Claims, 10 Drawing Sheets

U.S. PATENT DOCUMENTS

| | | | |
|---|---|---|---|
| 4,256,925 A | 3/1981 | Gooke | 370/104 |
| 4,291,406 A | 9/1981 | Bahl et al. | 371/44 |
| 4,298,979 A | 11/1981 | Dobyns et al. | 370/104 |
| 4,301,530 A | 11/1981 | Gutleber | 370/18 |
| 4,319,353 A | 3/1982 | Alvarez, III et al. | 370/104 |
| 4,322,845 A | 3/1982 | Fennel, Jr. et al. | 370/104 |
| 4,339,818 A | 7/1982 | Gruenberg | 370/112 |
| 4,369,434 A | 1/1983 | Mueller | 340/347 DD |
| 4,373,151 A | 2/1983 | Houdard et al. | 329/104 |
| 4,383,315 A | 5/1983 | Torng | 370/89 |
| 4,424,417 A | 1/1984 | Chavey et al. | 179/2 E |
| 4,445,213 A | 4/1984 | Baugh et al. | 370/94 |
| 4,455,649 A | 6/1984 | Esteban et al. | 370/80 |
| 4,460,992 A | 7/1984 | Gutleber | 375/19 |
| 4,472,815 A | 9/1984 | Gutleber | 375/34 |
| 4,477,900 A | 10/1984 | Gruenberg | 370/112 |
| 4,491,947 A | 1/1985 | Frank | 370/94 |
| 4,494,232 A | 1/1985 | Dambrackas et al. | 370/80 |
| 4,547,880 A | 10/1985 | De Vita et al. | 370/91 |
| 4,562,572 A | 12/1985 | Goldman et al. | 370/80 |
| 4,587,652 A | 5/1986 | Goldman | 370/110.1 |
| 4,594,476 A | 6/1986 | Freeman | 179/6.08 |
| 4,635,221 A | 1/1987 | Kerr | 364/821 |
| 4,688,035 A | 8/1987 | Gray et al. | 340/825.52 |
| 4,726,014 A | 2/1988 | Goldman et al. | 370/58 |
| 4,730,340 A | 3/1988 | Frazier, Jr. | 375/1 |
| 4,775,987 A | 10/1988 | Miller | 375/38 |
| 4,789,983 A * | 12/1988 | Acampora et al. | 370/96 |
| 4,813,040 A | 3/1989 | Futato | 370/111 |
| 4,839,892 A | 6/1989 | Sasaki | 370/95 |
| 4,870,642 A | 9/1989 | Nohara et al. | 370/75 |
| 4,872,200 A | 10/1989 | Jansen | 380/34 |
| 4,876,698 A | 10/1989 | Boisson et al. | 375/25 |
| 4,884,263 A | 11/1989 | Suzuki | 370/16 |
| 4,899,337 A | 2/1990 | Hirai | 370/80 |
| 4,901,307 A | 2/1990 | Gilhousen et al. | 370/18 |
| 4,930,118 A | 5/1990 | Sugihara | 370/16 |
| 4,933,952 A | 6/1990 | Albrieux et al. | 375/1 |
| 4,939,745 A | 7/1990 | Kirimoto et al. | 375/1 |
| 4,965,796 A | 10/1990 | Petty | 370/112 |
| 4,970,648 A | 11/1990 | Capots | 364/424.06 |
| 5,003,533 A | 3/1991 | Watanabe | 370/85.5 |
| 5,003,534 A | 3/1991 | Gerhardt et al. | 370/94.1 |
| 5,022,046 A | 6/1991 | Morrow, Jr. | 375/1 |
| 5,068,849 A | 11/1991 | Tanaka | 370/85.5 |
| 5,101,501 A | 3/1992 | Gilhousen et al. | 455/33 |
| 5,103,459 A | 4/1992 | Gilhousen et al. | 375/1 |
| 5,107,377 A | 4/1992 | Ballard | 360/40 |
| 5,109,390 A | 4/1992 | Gilhousen et al. | |
| 5,115,429 A | 5/1992 | Hluchyj et al. | 370/84 |
| 5,121,383 A | 6/1992 | Golestani | 370/60 |
| 5,136,586 A | 8/1992 | Greenblatt | 370/110.4 |
| 5,168,575 A | 12/1992 | Cizek et al. | 455/33.1 |
| 5,172,375 A | 12/1992 | Kou | 370/95.3 |
| 5,179,549 A | 1/1993 | Joos et al. | 370/17 |
| 5,212,684 A | 5/1993 | MacNamee et al. | 370/24 |
| 5,212,687 A | 5/1993 | De La Bourdonnaye | 370/84 |
| 5,216,503 A | 6/1993 | Paik et al. | 358/133 |
| 5,231,649 A | 7/1993 | Duncanson | 375/38 |
| 5,235,614 A | 8/1993 | Bruckert et al. | 375/1 |
| 5,247,702 A | 9/1993 | Su et al. | |
| 5,258,983 A | 11/1993 | Lane et al. | 370/118 |
| 5,267,261 A | 11/1993 | Blakeney et al. | |
| 5,276,730 A | 1/1994 | Cimini, Jr. et al. | 379/60 |
| 5,280,537 A | 1/1994 | Sugiyama et al. | 375/1 |
| 5,293,640 A | 3/1994 | Gunmar et al. | 455/33.1 |
| 5,305,308 A | 4/1994 | English et al. | 370/32.1 |
| 5,349,580 A | 9/1994 | Hester et al. | 370/84 |
| 5,351,240 A | 9/1994 | Highsmith | 370/84 |
| 5,371,734 A * | 12/1994 | Fischer | 370/348 |
| 5,381,412 A | 1/1995 | Otani | 370/84 |
| 5,400,328 A | 3/1995 | Burren et al. | 370/79 |
| 5,414,796 A | 5/1995 | Jacobs et al. | |
| 5,416,787 A | 5/1995 | Kodama et al. | 375/705 |
| 5,416,797 A | 5/1995 | Gilhousen et al. | |
| 5,420,861 A | 5/1995 | De La Bourdonnaye | 370/84 |
| 5,440,542 A | 8/1995 | Procter et al. | 370/18 |
| 5,442,625 A | 8/1995 | Gitlin et al. | 370/18 |
| 5,471,497 A | 11/1995 | Zehavi | 375/200 |
| 5,504,773 A | 4/1996 | Padovani et al. | |
| 5,515,365 A * | 5/1996 | Sumner et al. | 370/29 |
| 5,537,410 A | 7/1996 | Li | 370/84 |
| 5,566,175 A | 10/1996 | Davis | 370/84 |
| 5,568,483 A | 10/1996 | Padovani et al. | |
| 5,682,382 A * | 10/1997 | Shepard | 370/348 |
| 5,684,791 A * | 11/1997 | Raychaudhuri et al. | 370/310.2 |
| 5,699,355 A | 12/1997 | Natarajan | |
| 5,708,654 A * | 1/1998 | Arndt et al. | 370/242 |
| 5,733,502 A | 3/1998 | Margaria et al. | 370/18 |
| 5,822,318 A | 10/1998 | Tiedemann, Jr. et al. | |
| 5,859,840 A | 1/1999 | Tiedemann, Jr. et al. | |
| 5,893,035 A | 4/1999 | Chen | |
| 5,903,554 A | 5/1999 | Saints | |
| 5,915,119 A * | 6/1999 | Cone | 395/750.02 |
| 5,923,650 A * | 7/1999 | Chen et al. | 370/331 |
| 6,011,796 A | 1/2000 | Rezaiifar et al. | |
| 6,055,209 A | 4/2000 | Abo | |
| 6,072,784 A * | 6/2000 | Agrawal et al. | 370/311 |
| 6,078,577 A | 6/2000 | Bishop, Jr. et al. | |
| 6,137,840 A | 10/2000 | Tiedemann, Jr. et al. | |

FOREIGN PATENT DOCUMENTS

| | | |
|---|---|---|
| EP | 0418865 | 9/1990 |
| EP | 0444592 | 2/1991 |
| EP | 0633678 | 1/1995 |
| EP | 0656716 | 6/1995 |
| EP | 1137226 | 9/2001 |
| GB | 2022365 | 5/1979 |
| GB | 2182528 | 10/1985 |
| WO | 9107030 | 5/1991 |

OTHER PUBLICATIONS

European Search Report—European Patent Office 7005160—Munich Jul. 18, 2007.

International Search Report—Patent Cooperation Treaty—US98-02626—European Patent Office Oct. 22, 1998.

TIA-EIA-IS-95A—Mobile Station-Base Station Compatibility Standard For Dual-Mode Wideband Spread Spectrum Cellular System.

*Advanced Engineering Mathematics*, "Orthogonal Sets of Functions /4.7" Kreyszig, Erwin, pp. 186-190, John Wiley & Sons, Inc.

* cited by examiner

METHOD AND APPARATUS FOR FORWARD LINK RATE SCHEDULING

CLAIM OF PRIORITY UNDER 35 U.S.C. §120

The present Application for Patent is a continuation of continuation application Ser. No. 09/905,300 entitled "Method and Apparatus for Forward Link Rate Scheduling" filed Jul. 13, 2001, now U.S. Pat. No. 7,054,293, which claims priority to U.S. application Ser. No. 08/798,951, filed Feb. 11, 1997 and assigned to the assignee hereof and hereby expressly incorporated by reference herein.

BACKGROUND

1. Field of the Invention

The present invention relates to data communication. More particularly, the present invention relates to a novel and improved method and apparatus for forward link rate scheduling of high speed data transmission in a communication system having a variable data transmission rate.

2. Description of the Related Art

A modern day communication system is required to support a variety of applications. One such communication system is a code division multiple access (CDMA) system which conforms to the "TIA/EIA/IS-95A Mobile Station-Base Station Compatibility Standard for Dual-Mode Wideband Spread Spectrum Cellular System", hereinafter referred to as the IS-95A standard. The CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present invention and incorporated by reference herein.

The IS-95A standard is designed to optimize voice communication and many important system design parameters are selected to achieve that goal. For example, since time delay between speakers cannot be tolerated, processing delays are sought to be minimized. Each user is allocated a traffic channel capable of carrying speech data for the duration of the call. Upon termination of the call, the traffic channel becomes available for another user.

In accordance with the IS-95A standard, each traffic channel is designed to support a symbol rate of 19.2 Ksps. Using a rate ½ convolutional encoder, the data rate of each traffic channel approaches 9.6 Kbps. Although not specified by the IS-95A standard, higher data rates can by supported by the use of other code rates. For example, a data rate of 14.4 Kbps is achieved by using a rate ½ convolutional encoder and deleting two out of every eight symbols, to obtain a punctured rate ¾ convolutional encoder.

The CDMA system must work within the pre-existing frequency allocation in the cellular band. By design, a CDMA system which conforms to the IS-95A standard is allotted a 1.2288 MHz bandwidth to fully utilize the cellular band. The forward link refers to transmission from a cell to the remote stations. On the forward link, the 1.2288 MHz bandwidth is divided into 64 code channels, with each code channel having a capacity of 19.2 Ksps. Most of the code channels are defined as traffic channels which are allocated, upon demand, to users for voice communication. Some code channels are defined as paging channels used for paging and messaging between the cell and the remote stations. Several code channels, such as the pilot and sync channels, are reserved for system overhead.

In the CDMA system, users communicate with one another through remote stations which, in turn, communicate with each other through one or more base stations. In this specification, base station refers to the hardware with which the remote stations communicate. Cell refers to the hardware or the geographic coverage area, depending on the context in which the term is used.

In the CDMA system, communications between users are conducted through one or more cells which are serviced by base stations. A first user on one remote station communicates to a second user on a second remote station, or a standard telephone, by transmitting voice data on the reverse link to a cell. The cell receives the voice data and can route the data to another cell or a public switched telephone network (PSTN). If the second user is on a remote station, the data is transmitted on the forward link of the same cell, or a second cell, to the second remote station. Otherwise, the data is routed through the PSTN to the second user on the standard phone system. In IS-95A systems, the forward link and the reverse link are allocated separate frequency and are independent of one another.

The remote station communicates with at least one cell during a communication. CDMA remote station are capable of communicating with multiple cells simultaneously during soft handoff. Soft handoff is the process of establishing a link with a new cell before breaking the link with the previous cell. Soft handoff minimizes the probability of dropped calls. The method and system for providing a communication with a remote station through more than one cell during the soft handoff process are disclosed in U.S. Pat. No. 5,267,261, entitled "MOBILE ASSISTED SOFT HANDOFF IN A CDMA CELLULAR TELEPHONE SYSTEM," assigned to the assignee of the present invention and incorporated by reference herein. Soft handoff impacts various aspects of the CDMA system design because considerations should be given to the status and capacity of each of the multiple cells involved in the soft handoff when a new allocation of resource is made.

The CDMA system is a spread spectrum communication system. The benefits of spread spectrum communication are well known in the art and can be appreciated by reference to the above cited references. Each code channel in the CDMA system can transmit up to 19.2 Ksps. The 19.2 Ksps is then spread over the entire 1.2288 MHz system bandwidth. The IS-95A CDMA system increases capacity by transmitting fewer bits, thereby using less power, when the user is not speaking. Since the forward link capacity between the cell and the remote station is limited by the maximum transmit power available for the cell, decreasing the transmit power during idle periods increases the forward link capacity.

The user on each remote station transmits at a different bit rate depending on the level of speech activity in the conversation of that user. A variable rate speech vocoder provides speech data at full rate when the user is actively speaking and at low rate during period of silence, e.g. pauses. The variable rate vocoder is described in detail in U.S. Pat. No. 5,414,796, entitled "VARIABLE RATE VOCODER," assigned to the assignee of the present invention and incorporated by reference herein.

The forward link capacity for voice communication between the cell and the remote stations, as measured by the number of users supportable by the CDMA system, can be determined by the bit rate of the user on each remote station. This is because other parameters determinative of the forward link capacity are fixed by the system design or given. For example, the maximum transmit power available for each cell is limited by FCC regulations and also by the acceptable levels of adjacent cell interference. The transmit power required for a given symbol rate depends on the energy-per-bit-to-noise ratio (Eb/No) required by the remote station, the path loss (e.g. location of the remote station within the cell) and the noise level, all of which cannot be controlled. The Eb/No required to maintain the desired level of performance is dependent on the channel condition, e.g. fading. Finally, the CDMA system bandwidth of 1.2288 MHz is selected by design.

On the forward link, the required transmit power is also dependent on the orthogonality of the code channels. Walsh code spreading is used to achieve orthogonality of the forward link code channels. The orthogonality minimizes the interference between the code channels. This orthogonality is not preserved in a multipath environment and, as the result, the level of interference increase. The required transmit power is then increased to maintain the same operating Eb/No.

The amount of speech activity at any given moment is non-deterministic. Also, there is typically no correlation in the level of speech activities among users. Therefore, the total power transmitted from a cell to all users in that cell varies over time and can be approximated as a Gaussian distribution. During the period of time when the level of speech activities is high and the required transmit power exceeds the maximum transmit power available to the cell, each voice data bit is transmitted with less power than would be optimal. Since the path loss is fixed, the Eb/No drops. The lower Eb/No increases the probability of frame errors in the voice data received by the users. This event is known as an outage.

The number of users able to have access to the communication system is limited so that a predetermined frame error rate (FER) is maintained. Limiting the forward link capacity to maintain the predetermined FER has the effect of forcing the cell to transmit at less than full capacity, on the average, thereby under-utilizing the forward link capacity of the cell. In the worse case, up to half of the forward link capacity is wasted to maintain a headroom of up to 3 dB. The headroom is the difference between the maximum transmit power available to the cell and the average transmit power of the cell. The headroom is only utilized during the period when the speech activities of the users are high.

Data communication within the CDMA system has different characteristics than voice communication. For example, data communication is typically characterized by long period of inactivity, or low activity, punctuated by high bursts of data traffic. An important system requirement for data communication is the transmission delay required to transfer the burst of data. Transmission delay does not have the same impact in data communication as it does for voice communication, but it is an important metric for measuring the quality of the data communication system.

A method for transmitting data traffic in code channel frames of fixed size, wherein the data source provides data at a variable rate, is described in detail in U.S. Pat. No. 5,504,773, entitled "METHOD AND APPARATUS FOR THE FORMATTING OF DATA FOR TRANSMISSION", assigned to the assignee of the present invention and incorporated by reference herein. Data is partitioned into data frames and each data frame may be further partitioned into data portions. The data portions are then encoded into code channel frames which are 20 msec wide. At the 19.2 Ksps symbol rate, each code channel frame contains 384 symbols. A rate ½, or a rate ½ punctured to obtain a rate ¾, convolutional encoder is used to encode the data, depending on the application. Using a rate ½ encoder, the information rate is approximately 9.6 Kbps. At the 9.6 Kbps data rate, there are 172 data bits, 12 cyclic redundancy check (CRC) bits and 8 code tail bits per code channel frame.

High speed data transmission on the forward link can be achieved by concurrently transmitting data traffic over multiple code channels. The use of multiple code channels for data transmission is disclosed in U.S. patent application Ser. No. 08/656,649, entitled "METHOD AND APPARATUS FOR PROVIDING RATE SCHEDULED DATA IN A SPREAD SPECTRUM COMMUNICATION SYSTEM", filed May 31, 1996, assigned to the assignee of the present invention and incorporated by reference herein.

The demand for the forward link continuously changes over time, in part due to variations in the level of voice activities. The inefficient use of the forward link can be improved by transmitting data traffic during the period of low voice activity. To avoid degradation in the quality of the voice communication, the data transmission should be dynamically adjusted to match the available forward link capacity of the cell.

In dealing with large sporadic bursts of data traffic, a system should be designed with the capability to transmit at high data rates and the ability to allocate the forward link resource to the users whenever requested, based on the availability of the resource. In a CDMA system, the design should address other existing system considerations. First, since voice communication cannot tolerate extensive delay, priority should be given to transmission of voice data over transmission of any data traffic. Second, since the amount of voice activity at any given moment is unpredictable, the forward link should be continuously monitored and the data transmission should be dynamically adjusted so that the forward link capacity is not exceeded. Third, since the user may be in soft handoff between multiple cells, the data transmission rate should be assigned based on the forward link capacity of each of the cells participating in the soft handoff. These and other considerations are addressed by the present invention.

SUMMARY OF THE INVENTION

The present invention is a novel and improved method and apparatus for the scheduling of high speed data transmission. The present invention improves utilization of the forward link and decreases the transmission delay in data communication in a CDMA system by providing for means of transmitting data traffic over the primary and secondary code channels. Each remote station is assigned one primary code channel for the duration of the communication with a cell. The primary code channel can be used by the cell to transmit unscheduled transmissions of small amounts of data and control messages without the additional delay caused by scheduling. Each remote station can be assigned zero or more secondary code channels. The secondary code channels can be of various types, and each type can have the same or different transmission capacity as the primary code channel. Secondary code channels are assigned by the channel scheduler for scheduled transmission of data traffic at high rates. The secondary code channels are assigned by a channel scheduler at each scheduling period, and can be reassigned during the scheduling period, according to the availability of the forward link capacity. Furthermore, the secondary code channels can be grouped into sets of secondary code channels, with each set defined by a unique grouping of secondary code channels.

It is an object of the present invention to improve utilization of the forward link capacity in a CDMA system. When the cell has a large amount of data to transmit to the remote station, the channel scheduler collects information on how much data is to be transmitted, the available forward link capacity for each cell in the network, and other parameters to be discussed below. Based on the collected information and in accordance with a list of system goals, the channel scheduler schedules the high speed data transmission by allocating a resource to the remote station and selecting a set of secondary code channels corresponding to an assigned transmission rate. The data is partitioned into data frames, and each data frame can be further partitioned into data portions. All data portions are encoded and spread into code channel frames. The code channel frames are transmitted over the assigned primary and secondary code channels. The remote station receives the code channel frames on each of the assigned code channels and reassembles the data portions of the code channel frames. If the demand for the forward link transmit power increases, one or more secondary code channels can be temporarily dropped, as necessary, to satisfy the additional demand.

It is another object of the present invention to minimize the transmission delay of data traffic over the forward link. The data transmission rate is assigned by the channel scheduler based on the amount of data to be transmitted. Small amounts of data are transmitted immediately on the primary code channel. For larger amounts of data, the channel scheduler assigns secondary code channels. The secondary code channels increase the forward link transmission rate and thus decrease the time required to transmit larger amounts of data.

It is yet another object of the present invention to optimize utilization of the forward link by allocating the available resource to users based on a set of priorities. The users within the CDMA system are assigned a priority based on a set of factors. These factors include the transmit energy-per-bit required by the user for the requisite level of performance, the list of cells supporting the user, the amount of data to be transmitted, the type of data to be transmitted, the type of data service being provided to the user and the amount of delay already experienced by the user. The available resource is allocated first to the highest priority user and last to the lowest priority user.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
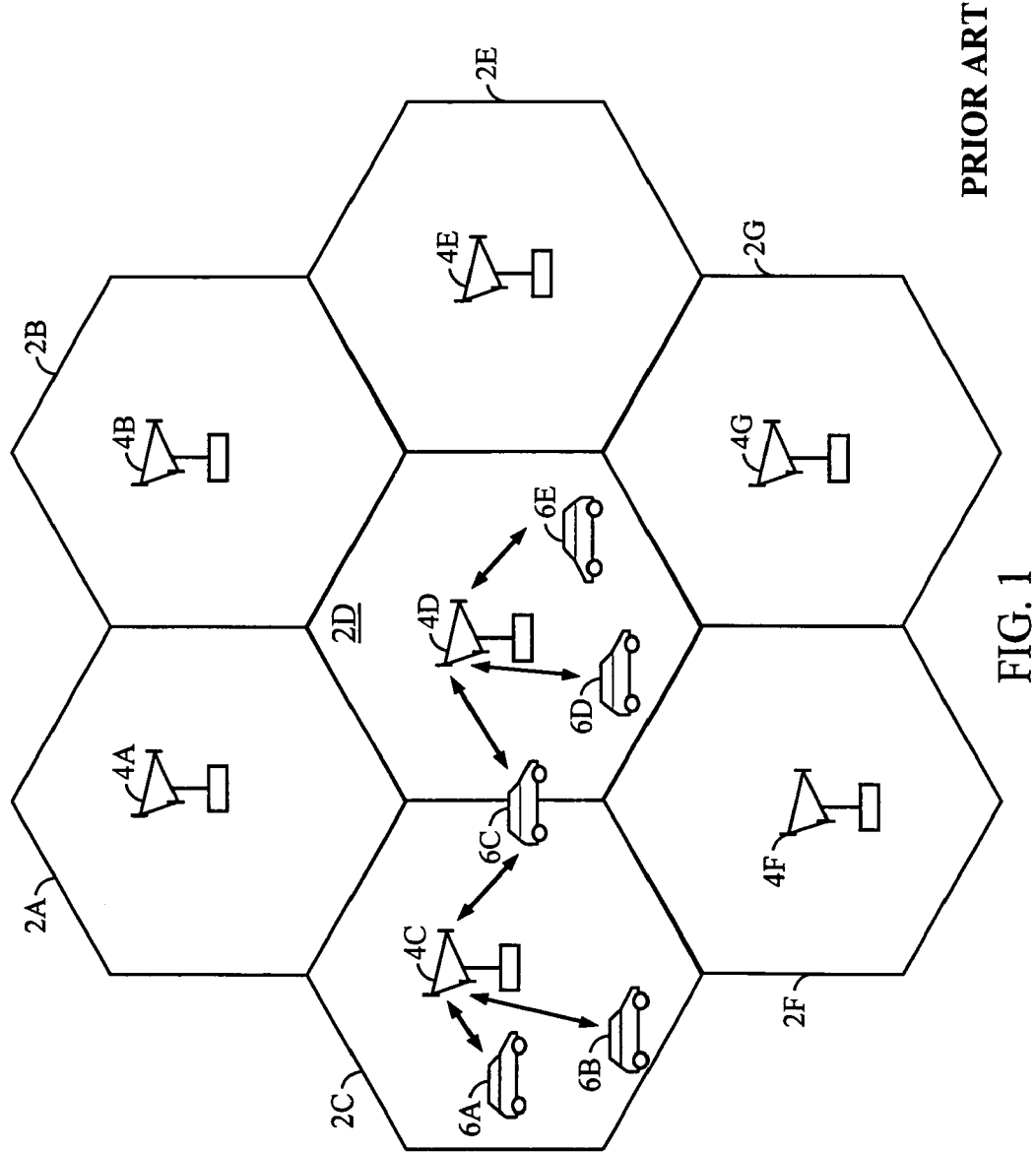
FIG. 1 is a diagram of a cellular network comprising a plurality of cells, a plurality of base stations and a plurality of remote stations.

Referring to the figures, FIG. 1 represents an exemplary cellular communication network composed of multiple cells 2a-2g. Each cell 2 is serviced by a corresponding base station 4. In the exemplary embodiment, the cellular network is a CDMA communication network, although the present invention is applicable to all wireless communication formats. Within the CDMA network, various remote stations 6 are dispersed throughout. Each of remote stations 6 communicates with one or more cells, depending on whether the remote station is in soft handoff. For example, remote stations 6a and 6b communicate exclusively with base station 4c, remote stations 6d and 6e communicate exclusively with base station 4d, but remote station 6c which is located near a cell boundary is in soft handoff and communicates simultaneously with base stations 4c and 4d. The use of soft handoff in a CDMA system is described in detail in the aforementioned U.S. Pat. No. 5,267,261.

Figure 2:
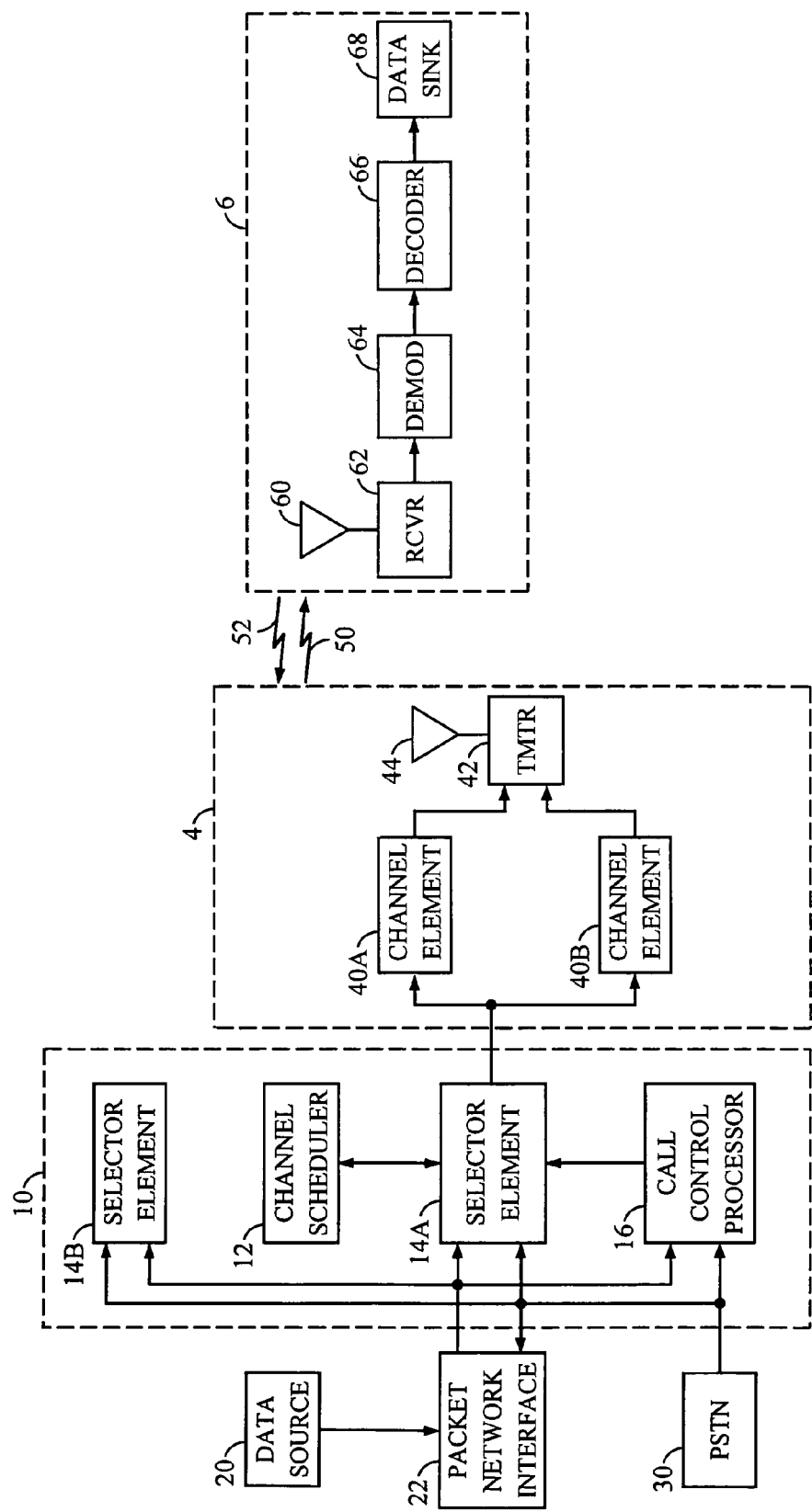
FIG. 2 is a block diagram illustrating the exemplary implementation of the present invention in a CDMA communication system.

An exemplary block diagram illustrating the basic architecture of the CDMA network of the present invention is shown in FIG. 2. Base station controller 10 interfaces with packet network interface (PNI) 22, PSTN 30, and all base stations 4 in the CDMA network (only one base station 4 is shown in FIG. 2 for simplicity). Base station controller 10 coordinates the communication between remote stations 6 in the CDMA network and other users connected to packet network interface 22 and PSTN 30. PSTN 30 interfaces with users through the standard telephone network (not shown in FIG. 2).

Data source 20 contains the large amount of information which is to be transmitted to remote station 6. Data source 20 provides the data to packet network interface 22. Packet network interface 22 receives the data and provides the data to selector element 14. Base station controller 10 contains many selector elements 14, although only two (14a and 14b) are shown in FIG. 2 for simplicity. One selector element 14 is assigned to control the communication between one or more base stations 4 and remote station 6. If selector element 14 has not been assigned to remote station 6, indicating that remote station 6 has not been assigned a primary code channel, packet network interface 22 informs call control processor 16 of the need to page remote station 6. Call control processor 16 then directs base station 4 to page remote station 6 and assigns a primary code channel to remote station 6. After remote station 6 has been assigned a primary code channel and selector element 14 has been allocated, packet network interface 22 delivers data from data source 20 to selector element 14. Selector element 14 maintains a queue which contains the data to be transmitted to remote station 6.

Channel scheduler 12 connects to all selector elements 14 within base station controller 10. Channel scheduler 12 schedules the high speed data transmission and assigns the code channels that will be used for the high speed data transmission on the forward link. The schedule of the assigned transmission rate is provided to selector element 14, routed through base station 4 and transmitted to remote station 6.

Selector element 14 sends the data, in data frames, to base station 4. In this specification, a data frame refers to the amount of data which is transmitted from base station 4 to remote station 6 within a one frame time period. If data transmission occurs over multiple code channels, the data frame is further partitioned into data portions, with each data portion transmitted over one primary or secondary code channel. Therefore, a data portion can be a fraction of the data frame or the entire data frame, depending on the number of code channels used. Each data portion is encoded and the resultant encoded data is referred to as a code channel frame.

The data frames are sent from selector element 14 to channel elements 40 a and 40b. Channel elements 40 a and 40b format the data frames, insert the set of generated CRC bits and a set of code tail bits, convolutionally encode the data, and interleave the encoded data in accordance to the aforementioned U.S. Pat. No. 5,504,773. Channel elements 40 a and 40b then spread the interleaved data with a long pseudo noise (PN) code, a Walsh code, and short $PN_I$ and $PN_Q$ codes. The spread data is upconverted, filtered, and amplified by transmitter (TMTR) 42 to obtain an RF signal. The RF signal is transmitted over the air through antenna 44 on forward link 50.

At remote station 6, the RF signal is received by antenna 60 and routed to receiver (RCVR) 62. Receiver 62 filters, amplifies, downconverts, and quantizes the RF signal and provides the digitized baseband signal to demodulator (DEMOD) 64. The digitized baseband signal is despread by demodulator 64 and the demodulated outputs from demodulator 64 are provided to decoder 66. Decoder 66 performs the inverse of the signal processing functions done at base station 4, specifically the de-interleaving, convolutional decoding, and CRC check functions. The decoded data is provided to data sink 68. The hardware, as described above, supports transmission of both data and voice communication over the CDMA network.

The functions described above can also be accomplished by other implementations. For example, channel scheduler 12 and selector element 14 can be included within base station 4. The location of channel scheduler 12 and selector element 14 is dependent on whether a centralized or distributed scheduling processing is desired. Therefore, other implementations of the above described functions can be contemplated and are within the scope of the present invention.

The forward link transmissions can be classified into two classes. The first class contains unscheduled tasks which, in the preferred embodiment, are not scheduled because of intolerance to additional processing delay. This class includes voice communications and some system overhead, such as the pilot, paging information, and acknowledgments to data traffic. The second class encompasses scheduled tasks which can tolerate additional processing and queuing delay. This class includes most data communications between the cells and remote stations 6. This second class can be assigned high rates.

As shown in FIG. 1, remote stations 6 are dispersed throughout the CDMA network and can be in communication with one or more cells simultaneously. Therefore, channel scheduler 12 coordinates transmissions of the scheduled and unscheduled tasks over the entire CDMA network. In the present invention, the transmission of the scheduled tasks on the forward link between the cells and remote stations 6 are scheduled by channel scheduler 12, based on the availability of the forward link capacity, in order to avoid degradation in the transmission of the scheduled and unscheduled tasks. Channel scheduler 12 is tasked with the function of allocating the available resource to each scheduled user on remote station 6 within the CDMA network such that a set of goals is optimized. These goals include (1) improved utilization of the forward link by transmitting as much scheduled and unscheduled tasks as can be supported within system capacity constraints, (2) improved quality in the communication by increasing the transmission rate and thus minimizing the transmission delay of the data, and (3) fair allocation of resources to all scheduled users based on a set of priorities. The goals are optimized by balancing a list of factors which are discussed in detail below.

Figure 3:
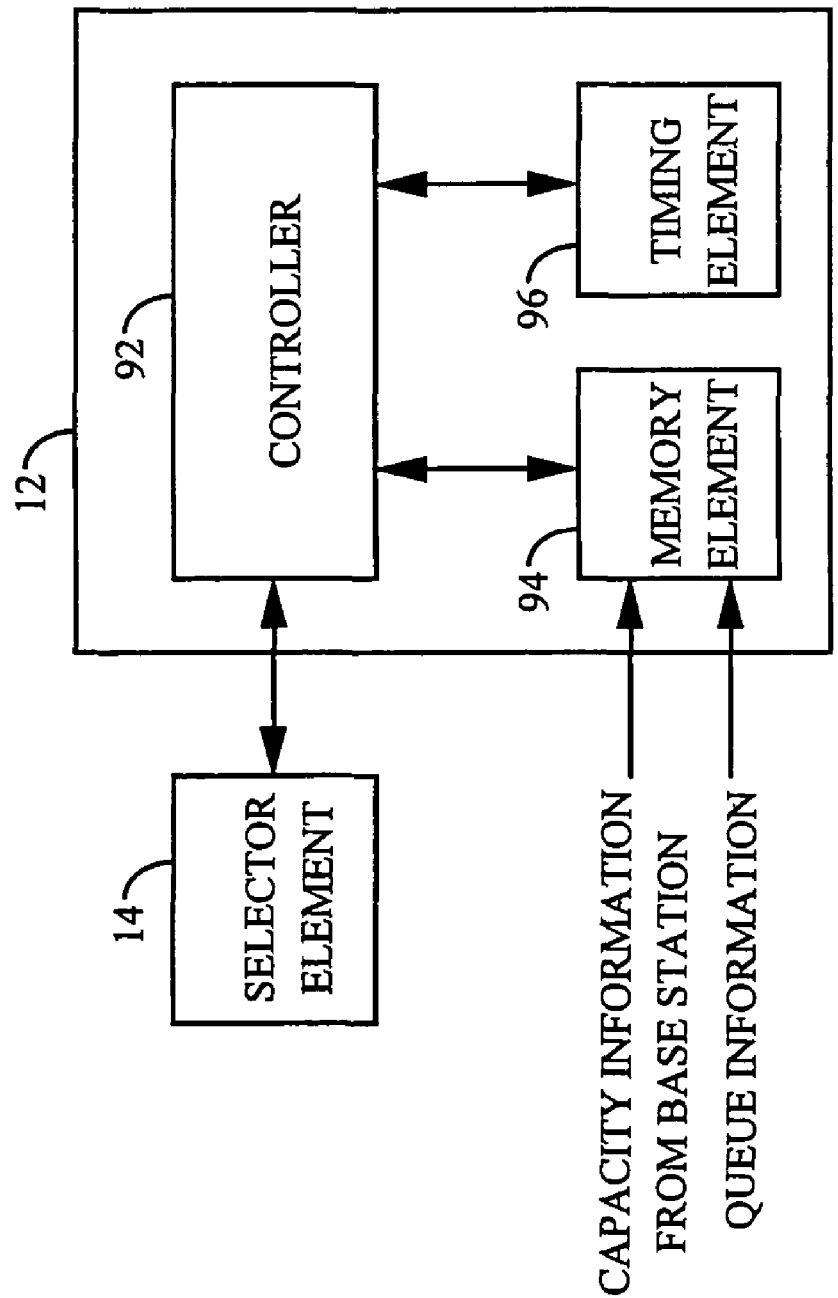
FIG. 3 is a block diagram of the channel controller.

A block diagram of channel scheduler 12 of the present invention is shown in FIG. 3. Controller 92 collects the pertinent information from all cells in the CDMA network and schedules high speed data transmissions. Controller 92 can be implemented in a microcontroller, a microprocessor, a digital signal processing (DSP) chip, or an ASIC programmed to perform the function as described herein. Controller 92 connects to all selector elements 14 within base station controller 10. Controller 92 collects information regarding the demand for the forward link and the capacity available at each cell. The collected information is stored in memory element 94 and retrieved by controller 92 as needed. Memory element 94 can be implemented using a storage element or one of any number of memory devices, such as RAM memory devices, latches, or other types of memory devices, that are known in the art. Controller 92 also connects to timing element 96. Timing element 96 can be implemented with a counter run by a system clock, an on board oscillator locked to an external signal, or a storage element for receiving system timing from an external source. Timing element 96 provides controller 92 with the timing signals necessary to perform the forward link rate scheduling. The timing signals also allow controller 92 to send the schedule of the assigned transmission rates to selector element 14 at the appropriate interval.

Forward Link Rate Scheduling

Figure 5:
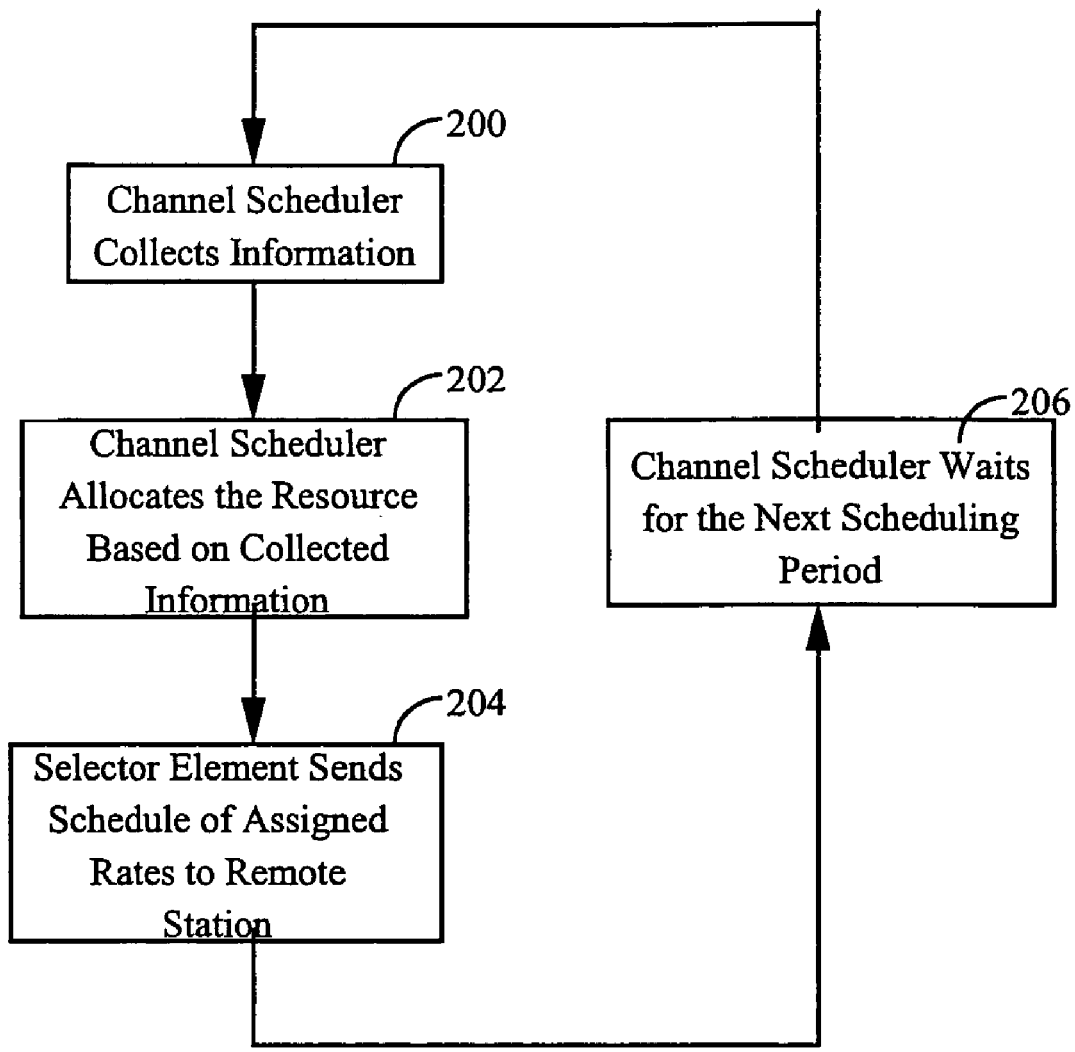
FIG. 5 is a flow diagram of the forward link rate scheduling of the present invention.

The flow diagram of the forward link rate scheduling methodology of the present invention is shown in FIG. 5. The first step in the scheduling process, step 200, involves the collection of all pertinent information necessary for the optimal allocation of resource for each scheduled user. The pertinent information may include the maximum transmit power available to each cell, the number of scheduled and unscheduled users, the transmit power for the unscheduled task for each remote station 6 during the prior scheduling periods, the transmit energy-per-bit for the scheduled tasks for the prior scheduling periods, the amount of data to be scheduled and transmitted to each user, the active member set of each remote station 6 listing the cells with which remote station 6 is in communication, the priority of the scheduled users, and the code channels available for transmission for each cell. Each of these parameters is discussed in detail below. Having collected the information from each cell, channel scheduler 12 allocates resource to the scheduled users based on the collected information and the set of aforementioned goals at step 202. The allocated resource can be in the form of an assigned transmission rate or an allocated transmit power. The allocated transmit power can then be equated to an assigned transmission rate based on the required energy-per-bit of the scheduled user. The schedule of the assigned transmission rates is then sent to each remote station 4 which has been assigned a transmission rate at step 204. Data is sent to selector element 14 and transmitted to remote station 6, at the assigned transmission rate, a predetermined number of frames later. Channel scheduler 12 then waits, at step 206, until the next scheduling period to restart the scheduling cycle.

As stated above, the allocation of resource can be accomplished by at least two embodiments. In the first embodiment, channel scheduler 12 assigns a data transmission rate to each scheduled user. And in the second embodiment, channel scheduler allocates a transmit power to each scheduled user.

Figure 6:
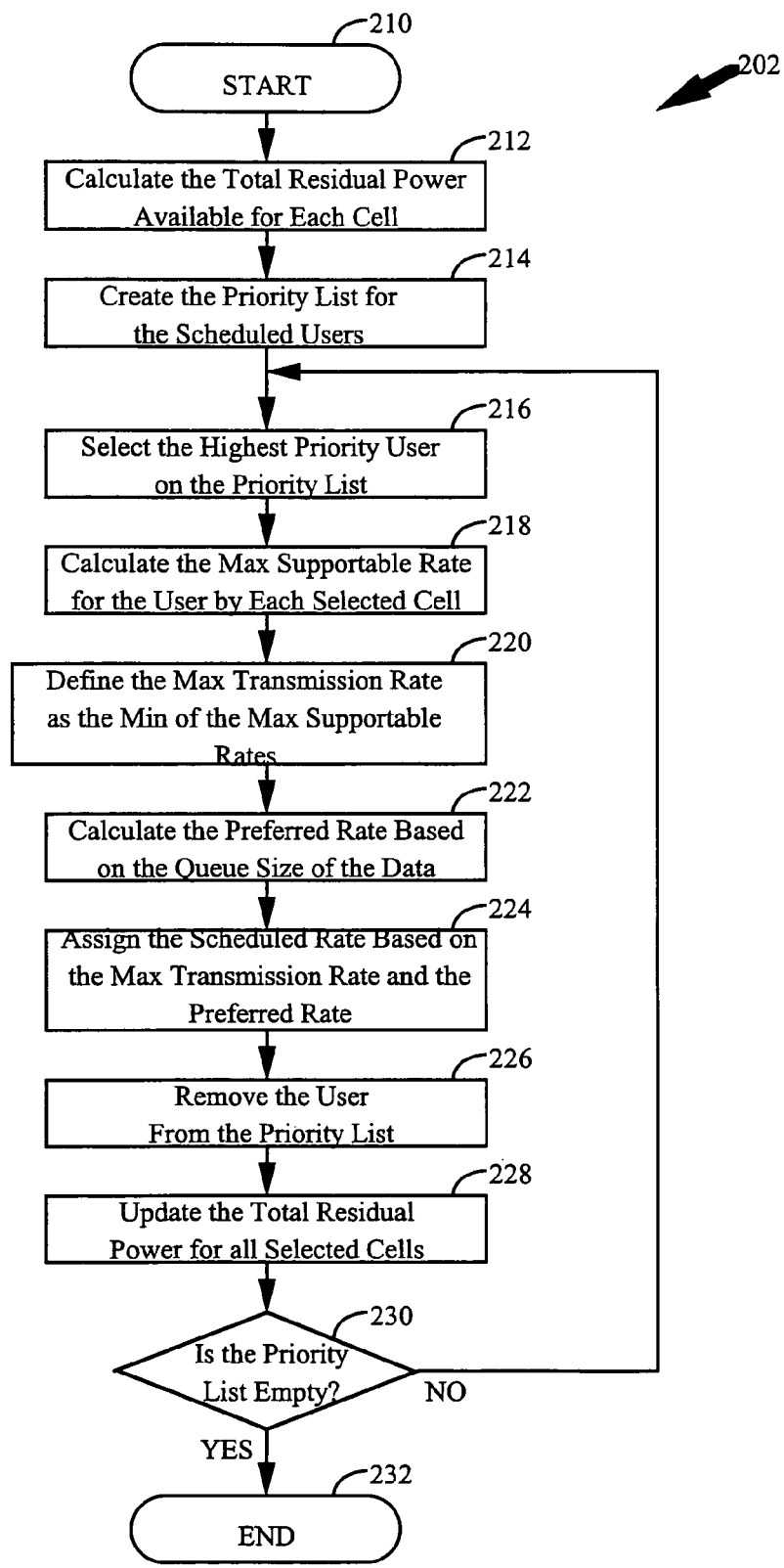
FIG. 6 is a flow diagram of the transmission rate assignment of the present invention.

In the first embodiment, the resource allocation for the scheduled users, at step 202 of the flow diagram in FIG. 5, is further illustrated by the flow diagram shown in FIG. 6. Channel scheduler 12 enters the flow diagram of FIG. 6 after having collected the pertinent information necessary for the optimal assignment of data transmission rates to the scheduled users. Channel scheduler 12 starts at state 210. In the first step, channel scheduler 12 calculates the total residual power available for each cell in the CDMA network at step 212. The total residual power available for scheduled transmission for each cell is calculated as:

$$P_j = P_{max,j} - P_{backoff,j} - \hat{P}_{unscheduled,j}, \qquad (1)$$

where $P_j$ is the total residual power available for cell j, $P_{max,j}$ is the maximum transmit power available for cell j, $P_{backoff,j}$ is the backoff power for cell j, and $\hat{P}_{unscheduled,j}$ is the predicted transmit power required for the unscheduled tasks at cell j. The backoff power is a value which allows the cells to account for variations in the required transmit power for the scheduled and unscheduled tasks within the scheduling period. The backoff power can also be used for the forward link power control of the scheduled tasks. A full discussion of each of the power terms in equation (1) and the derivation of equation (1) is given in detail below.

Channel scheduler 12 then creates a priority list of all scheduled users at step 214. The priority list is a function of numerous factors, each of which is discussed in detail below. The scheduled users are arranged according to their relative priority, with the scheduled user having the highest priority placed at the top of the list and the scheduled user having the lowest priority placed at the bottom of the list. Channel scheduler 12 then enters a loop and assigns the available forward link capacity to the scheduled users in accordance with the priority list.

In the first step within the transmission rate assignment loop, channel scheduler 12 selects the scheduled user on the priority list having the highest priority at step 216. Channel scheduler 12 then identifies the cells supporting this scheduled user. These cells are listed in the active member set of the scheduled user. In the exemplary embodiment, each cell in the active member set communicates with remote station 6 on the primary code channel. High speed data transmission over the secondary code channels can be accomplished through one or more cells in the active member set. Channel scheduler 12 first selects the cells in the active member set which is to support the high speed data transmission. For each selected cell, channel scheduler 12 calculates the maximum supportable transmission rate for the scheduled user at step 218. The maximum supportable transmission rate can be calculated by dividing the total residual power available for the selected cell by the energy-per-bit required to transmit to the user. To ensure that the transmit power to be allocated to this scheduled user can be provided by each selected cell, channel scheduler 12 selects the minimum transmission rate from the list of maximum supportable transmission rates at step 220. The selected minimum transmission rate is defined as the maximum transmission rate for this scheduled user. Channel scheduler 12 then determines the amount of data to be transmitted to the scheduled user by looking at the queue size of the data. From the queue size, channel scheduler 12 recommends a preferred transmission rate at step 222. The preferred transmission rate is at, or below, the minimum transmission rate required to transmit the data within the scheduling interval.

Channel scheduler 12 assigns a data transmission rate for the scheduled user based on the preferred transmission rate and the maximum transmission rate at step 224. The assigned transmission rate is the lower of preferred transmission rate and the maximum transmission rate, again to maintain compliance within the total residual power for the selected cells. Having assigned a data transmission rate to this scheduled user, channel scheduler 12 removes the scheduled user from the priority list at step 226. The total residual power available for each selected cell is then updated, at step 228, to reflect the power allocated to the scheduled user just removed from the priority list. Channel scheduler 12 then determines whether all scheduled users on the priority list have been assigned a transmission rate at step 230. If the priority list is not empty, channel scheduler 12 returns to step 216 and assigns a data transmission rate to the scheduled user with the next highest priority. The assignment loop is repeated until the priority list contains no scheduled user. If the priority list is empty, the assignment process terminates at state 232.

In the second embodiment, the resource allocation for the scheduled users, at step 202 of the flow diagram in FIG. 5, is accomplished by allocating a transmit power to each scheduled user. In this embodiment, steps 210, 212, and 214 are the same as in the first embodiment but the transmission rate assignment loop is replaced by a transmit power allocation loop. In the first step within the transmit power allocation loop, channel scheduler 12 selects the scheduled user on the priority list having the highest priority. Channel scheduler 12 then selects the cells in the active member set which is to support this scheduled user for high speed data transmission. For each selected cell, channel scheduler 12 calculates the maximum supportable transmit power for the scheduled user. To ensure that the allocated transmit power for this scheduled user can be provided by each selected cell, channel scheduler 12 selects the minimum transmit power from the list of maximum supportable transmit power. Channel scheduler 12 then recommends a preferred transmit power based on the queue size. The allocated transmit power is the lower of the minimum transmit power and the preferred transmit power. The allocated transmit power is then sent to selector element 14 which determines the assigned transmission rate based on the allocated transmit power and the required energy-per-bit of the scheduled user.

Having allocated a transmit power to this scheduled user, channel scheduler 12 removes the scheduled user from the priority list. The total residual power available for each selected cell is then updated to reflect the power allocated to the scheduled user just removed from the priority list. Channel scheduler 12 then determines whether all scheduled users on the priority list have been allocated a transmit power. If the priority list is not empty, channel scheduler 12 allocates a transmit power to the scheduled user with the next highest priority. The transmit power allocation loop is repeated until the priority list contains no scheduled user. If the priority list is empty, the allocation process terminates.

In the second embodiment, selector element 14 can assign new data transmission rates for the scheduled users at each frame in the scheduling period based on changes in the required Eb/No of the scheduled users. This allows selector element 14 to maintain a quality communication of the scheduled and unscheduled tasks by maintaining the required Eb/No while limiting the required transmit power within the maximum transmit power available for the cells.

The total residual power available for each selected cell can also be allocated to the scheduled users without the use of an allocation loop. For example, the total transmit power can be allocated according to a weighting function. The weighting function can be based on the priority of the scheduled users and/or some other factors.

The priority list determines the allocation of the resource, e.g. transmit power, to the scheduled users. A scheduled user having a higher priority is allocated more resource than one having a lower priority. Although it is preferable to allocate the resource in an order based on the priority of the scheduled user, this is not a necessary limitation. The available resource can be allocated in any order, and all are within the scope of the present invention.

The forward link rate scheduling of the present invention can be performed continuously, periodically, or in a staggered manner. If the scheduling is performed continuously or periodically, the scheduling interval is selected such that the transmit power of the cells is fully utilized for the duration of the scheduling period but does not exceed the maximum transmit power available for each cell. This objective can be accomplished by the following embodiments. Other embodiments which are variations or combinations of the following embodiments can be contemplated and are within the scope of the present invention.

In the first embodiment, the scheduling (or resource allocation) is performed every frame. This embodiment allows channel scheduler 12 to dynamically adjust the transmit power required by the scheduled tasks at each frame to fully utilize the total residual power available for each cell in the network. More processing is required to allocate the resource at each frame. Also, more overhead is required to transmit the necessary scheduling information to each scheduled user at each frame.

In the second embodiment, the scheduling is performed every K frames, where K is an integer greater than one. For each scheduling interval, channel scheduler 12 allocates the maximum amount of resource for each scheduled task. In the exemplary embodiment, the maximum allocated resource can be calculated by removing the backoff power, $P_{backoff,j}$, from equation (1) and/or using a low prediction of the required transmit power, $\hat{P}_{unscheduled,j}$, for the unscheduled tasks. Alternately, the maximum allocated resource can be calculated by using a value greater than the actual $P_{max,j}$ in equation (1). The schedule of the assigned transmission rates is transmitted to the scheduled users once per scheduling period. Data transmissions at the assigned transmission rates occur at a predetermined number of frames later, as discussed below. The maximum allocated resource for the scheduled tasks is allocated by channel scheduler 12 for the duration of the scheduling period. During a scheduling period, if the total residual power available for the cells does not support data transmission at the assigned transmission rates, channel scheduler 12 can direct data transmission at lower transmission rates.

The second embodiment has the advantage of requiring less overhead to transmit the schedule of the assigned transmission rates to the scheduled users. In the first embodiment, the schedule of the assigned rates is transmitted at each frame to the scheduled users. A portion of the available transmit power is thus allocated to this overhead. In the second embodiment, the schedule of the assigned transmission rates is transmitted once per scheduling period to the scheduled users. For example, if the scheduling interval is ten frames, the second embodiment requires slightly more than 1/10 of the overhead of the first embodiment while still maintaining efficient utilization of the forward link.

Alternately, in the third embodiment, the forward link rate scheduling of the present invention can be staggered. In this embodiment, the scheduling can be triggered by certain events. For example, channel scheduler 12 can perform the forward link rate scheduling whenever a request for high speed data transmission is received or whenever a scheduled high speed data transmission to remote station 6 is completed. Channel scheduler 12 has knowledge of the amount of data to be transmitted to each remote station 6 and the assigned transmission rate. Thus, channel scheduler 12 is able to determine when the high speed data transmission is completed. Upon termination of a scheduled transmission to remote station 6, channel scheduler 12 can perform the scheduling and allocate the forward link resource to other remote stations 6. The assigned transmission rate is transmitted to remote stations 6 which has been assigned a transmission rate.

The forward link rate scheduling of the present invention can be performed by channel scheduler 12 for all cells in the CDMA network. This implementation enables channel scheduler 12 to effectively schedule high speed data transmission for remote stations 6 which are in soft handoff and are in communication with multiple cells. Scheduling for the entire network is more complex because of the various interactions between the cells and remote stations 6. To simplify the scheduling, the scheduled tasks can be divided into two categories, specifically, scheduled tasks for remote stations 6 which are in soft handoff and scheduled tasks for remote stations 6 which are not in soft handoff. Using this implementation, the forward link rate scheduling for remote stations 6 which are in communication with only one cell can be performed at the cell level. Remote stations 6 which are in communication with multiple cells can be scheduled by channel scheduler 12. The present invention is applicable to all implementations of the forward link rate scheduling, including centralized scheduling, distributed scheduling, and any combinations thereof.

Resource Reallocation

In the first embodiment described above, wherein the resource allocation is performed at every frame, the resource can be reallocated during the scheduling period to match the forward link demand with the available transmit power. Although the resource is allocated at every frame, the scheduling delay may have resulted in sub-optimal resource allocation. During the scheduling delay, the status of the system may have changed. Also, the initial predictions may not have been accurate and may require modification.

In the second embodiment, wherein the resource allocation is performed every K frames, the resource can also be reallocated during the scheduling period. In the exemplary implementation of the second embodiment, data transmission occurs at the assigned transmission rate for the duration of the scheduling period, without the use of the resource reallocation routine. This simplifies the scheduling routine but can result in outages, which arise when the required transmit power exceeds the maximum transmit power available for the cell. In the preferred implementation, the resource is reallocated each frame to minimize outages.

During the scheduling period, if the total residual power for the cells does not support data transmissions at the assigned transmission rates, channel scheduler 12 can direct data transmissions to be at lower transmission rates. For each frame in which the total residual power for the cells is inadequate to service the demand by the scheduled and unscheduled tasks, channel scheduler 12 determines the amount of the increase in the forward link demand, the available forward link resource, and assigns lower transmission rates for some or all scheduled users such that the required transmit power for the cells does not exceed the maximum transmit power available for the cells. In the exemplary embodiment, the lower transmission rates are referred to as the temporary transmission rates and are used for only one frame. For subsequent frames in the scheduling period, the assigned transmission rates are used unless they are modified, again, by channel scheduler 12. In the exemplary embodiment, the resource reallocation is performed at every frame to ensure that the transmit power required for the scheduled and unscheduled tasks for each cell is less than the maximum transmit power available for the cells. The resource reallocation can be accomplished by several embodiments, two of which are described below. Other embodiments can also be contemplated and are within the scope of the present invention.

Figure 7:
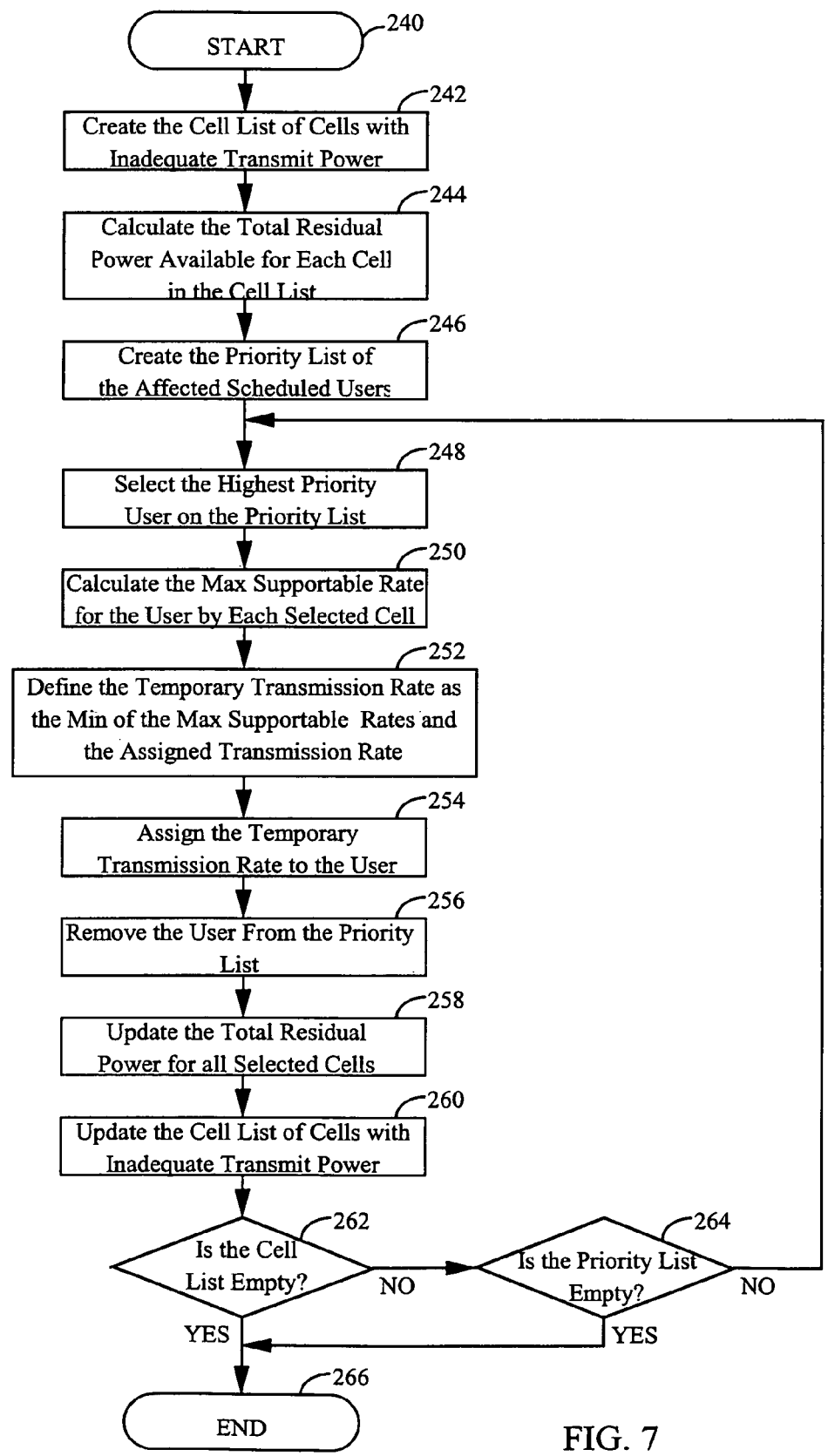
FIG. 7 is a flow diagram of the transmission rate reassignment of the present invention.

In the first embodiment, which is complementary to the first embodiment of the resource allocation routine described above, the resource reallocation is accomplished by transmission rate reassignment. This embodiment is illustrated by the flow diagram shown in FIG. 7. Channel scheduler 12 starts at state 240. In the first step, at step 242, channel scheduler 12 creates a cell list of cells in the network in which the transmit power required for the scheduled and unscheduled tasks exceeds the transmit power available for the cell. Channel scheduler 12 then calculates the total residual power available for each cell in the cell list using equation (1) at step 244. Next, channel scheduler 12 creates the priority list of all scheduled users which are in communication with at least one cell in the cell list and which have been assigned a transmission rate for the current scheduling period at step 246. The scheduled users in the priority list are referred to as the affected scheduled users. Channel scheduler 12 then enters a loop and reassigns the transmission rate of some or all affected scheduled users in accordance with the priority list and the cell list.

In the first step within the transmission rate reassignment loop, channel scheduler 12 selects the affected scheduled user having the highest priority at step 248. Channel scheduler 12 then identifies the cells supporting the affected scheduled user for high speed data transmission. These cells are referred to as the selected cells. Next, channel scheduler 12 calculates the maximum supportable transmission rate for the affected scheduled user by each selected cell at step 250. To ensure that the required transmit power for this scheduled user can be provided by each of the selected cells, channel scheduler 12 selects the minimum transmission rate from the list of maximum supportable transmission rates and the assigned transmission rate at step 252. The selected minimum transmission rate is defined as the temporary transmission rate. In the preferred embodiment, the temporary transmission rate is only assigned to the scheduled user for the upcoming frame at step 254. The affected scheduled user is removed from the priority list at step 256. The total residual power available for each selected cell is then updated, at step 258, to reflect the power allocated to the affected scheduled user just removed from the priority list. Channel scheduler 12 then updates the cell list and removes the cells for which the total residual power is zero at step 260. Next, channel scheduler 12 determines whether the cell list is empty at step 262. If the cell list is not empty, channel scheduler 12 determines if the priority list is empty at step 264. If the priority list is not empty, channel scheduler 12 returns to step 248 and reassigns a data transmission rate to the affected scheduled user with the next highest priority. The transmission rate reassignment loop continues until the cell list or the priority list is empty. If the cell list or the priority list is empty, the transmission rate reassignment process terminates at state 266.

In the second embodiment, which is complementary to the second embodiment of the resource allocation routine described above, the resource reallocation is accomplished by transmit power reallocation. In this embodiment, steps 240, 242, and 244 are the same as in the first embodiment but the transmission rate reassignment loop is replaced with a transmit power reallocation loop. In the first step within the transmit power reallocation loop, channel scheduler 12 creates a cell list of cells in the network in which the transmit power required for the scheduled and unscheduled tasks exceeds the transmit power available for the cell. The power shortage is defined as the amount of transmit power required by a cell minus the transmit power available for a cell. Next, channel scheduler 12 creates the priority list of all scheduled users which are in communication with at least one cell in the cell list and which have been allocated a transmit power for the current scheduling period. The scheduled users in the priority list are referred to as the affected scheduled users. Channel scheduler 12 then enters a loop and reallocates the transmit power of some or all affected scheduled users in accordance with the priority list and the cell list.

In the first step within the transmit power reallocation loop, channel scheduler 12 selects the affected scheduled user having the lowest priority. Channel scheduler 12 then identifies the cells supporting the affected scheduled user for high speed data transmission and reallocates the transmit power to reduce the power shortage. The reallocated transmit power is sent to selector element 14 which determines the temporary transmission rate based on the reallocated transmit power and the required energy-per-bit of the affected scheduled user. The affected scheduled user is then removed from the priority list and the power shortage for each selected cell is updated to reflect the power recaptured. Next, channel scheduler 12 updates the cell list and removes the cells for which there is no power shortage. If the cell list and the priority list are both not empty, channel scheduler 12 reallocates the transmit power of the affected scheduled user with the next lowest priority. The transmit power reallocation loop continues until the cell list or the priority list is empty. If the cell list or the priority list is empty, the transmit power reallocation process terminates.

The resource reallocation performed at each frame in the scheduling period allows channel scheduler 12 to dynamically allocate the forward link resource at each frame. The additional overhead necessary to transmit the schedule of the temporary transmission rates is minimal, since the transmission rate of only a fraction of the scheduled users are reassigned at each frame. In fact, just enough scheduled users are reassigned so that all cells in the network transmit at less than the maximum transmit power available for the cells.

Data transmission and reception at the temporary transmission rate can be accomplished by numerous embodiments, three of which are described below. Other embodiments can be contemplated and are within the scope of the present invention. In the exemplary implementation of these embodiments, the high speed data transmission occurs over multiple code channels. The concept of using multiple code channels and code channel sets for high speed data transmission is described in detail below. In essence, the transmission rate assigned by channel scheduler 12 for each remote station 6 is equated to a set of code channels. The identity of the assigned code channels is transmitted to each remote station 6. Each remote station 6 receives the data transmitted on the assigned code channels for each frame in the scheduling period. For data transmission at the temporary transmission rate, a subset of the assigned code channels are used.

In the first embodiment, the temporary transmission rates are transmitted on the primary code channels to the affected scheduled users on remote stations 6. Concurrently, in the same frame, data is transmitted to the affected scheduled users at the temporary transmission rates. The identity of the subset is transmitted to remote station 6 at each frame in which data transmission occurs at the temporary transmission rate. Remote stations 6 demodulate the primary code channel and the secondary code channels associated with the assigned transmission rates. Remote stations 6 then retain the data received on the secondary code channels associated with the temporary transmission rates and discard the remaining data.

At each frame within the scheduling period, each scheduled user receives data transmission at the assigned transmission rate. For each frame, the scheduled user verifies that the transmission rate has not been reassigned. If the scheduled user determines that data transmission occurred at the temporary transmission rate, the scheduled user retains the portion of data received within the temporary transmission rate and discards the remaining data. The received data may need to be stored for one frame before the scheduled user is able to determine which subset of the received data is valid due to delay in processing the primary code channel.

In the second embodiment, the temporary transmission rates are transmitted on the primary code channels to the affected scheduled user on remote stations 6. Data transmission at the temporary transmission rate occurs two frames later, after remote stations 6 receive the temporary transmission rates and configure the hardware to receive data transmission at the temporary transmission rates. This embodiment has additional processing delay but minimizes the buffering requirement of remote station 6. However, this embodiment saves battery power at remote station 6 since only the code channels which carry the high speed data transmission are demodulated and decoded. But because of the scheduling delay, dynamic allocation of resource is not optimal. Furthermore, the scheduling delay may result in a higher backoff power requirement in equation (1).

And in the third embodiment, remote stations 6 demodulate all secondary code channel associated with the assigned transmission rate and performs the CRC check of the received code channel frames. Remote stations 6 then retain the data portions of the code channel frames which contain no frame error and discard the code channel frames which contain frame error.

Transmit Power Consideration

As stated previously, the transmit power required for unscheduled tasks, such as voice communication, varies with time but is allocated, upon demand, to the requesting remote stations 6. To maintain the signal quality at an acceptable level, the required total transmit power by each cell should be below the maximum transmit power available for the cell. Therefore, the required total transmit power by each cell should satisfy the following equation:

$$P_{unscheduled,j} + \sum_{i=1}^{N_j} p_{ij} \leq P_{max,j}, \quad (2)$$

where $P_{unscheduled,j}$=required transmit power from the j-th cell for unscheduled tasks for the upcoming scheduling period.

$N_j$=number of scheduled users to be scheduled in the j-th cell, $p_{ij}$=required transmit power of the i-th scheduled user in the j-th cell, and $P_{max,j}$=maximum transmit power available for the j-th cell.

The required total transmit power by each cell should remain below the maximum transmit power available for that cell during the entire scheduling period, in order to avoid unexpected degradation in the transmission of the scheduled and unscheduled tasks. The maximum transmit power available for each cell may differ from cell to cell, although the upper limit is regulated by the FCC and network considerations of adjacent cell interference. The objective of channel scheduler 12 is to schedule transmission of scheduled tasks such that the transmit power during the entire scheduling period approaches the maximum transmit power but does not exceed it.

In a CDMA system which conforms to the IS-95A standard, the average transmit power by a cell is backed off from the maximum transmit power to maintain headroom. The headroom provides a margin to operate the dynamic power control mechanism on the forward link which is necessary in view of the mobility of remote station 6. The headroom also accommodates for variations in the required transmit power for the unscheduled tasks, such as the variations caused by changes in the amount of voice activities, during the scheduling period. Taking the backoff power into consideration, equation (2) becomes:

$$P_{unscheduled,j} + \sum_{i=1}^{N_j} p_{ij} \leq P_{max,j} - P_{backoff,j}. \quad (3)$$

As stated previously, the backoff power is required to accommodate for the dynamic variations in the unscheduled tasks. Operating the cell at an average transmit power that is backed off from the maximum transmit power is necessary to provide a quality communication of the scheduled and unscheduled tasks. The backoff power ensures that the transmit power is available during the period of high demand, e.g. high voice activities. The backoff power also represents an under-utilization of the forward link for the majority of the time, e.g. during the period of normal or low voice activities. Efficient utilization of the forward link is achieved by dynamically changing the transmit power for the scheduled tasks to compensate for the increase or decrease in the required transmit power for the unscheduled tasks.

In order to satisfy the constraint imposed by equation (3), channel scheduler 12 needs to determine the required transmit power for the unscheduled tasks for each cell for the upcoming scheduling period. The required transmit power for the unscheduled tasks is predominantly determined by the amount of voice activity and the channel condition. Therefore, the required transmit power cannot be determined with exact precision because of the unpredictable nature of speech and channel condition. The required transmit power for the unscheduled tasks can be predicted by averaging the actual transmitted power for the unscheduled tasks for prior scheduling periods. The predicted transmit power for the unscheduled tasks, denoted as $\hat{P}_{unscheduled,j}$, is then used in the subsequent power calculations.

The required transmit power, $p_{ij}$, for the scheduled tasks can be predicted by determining the transmit energy-per-bit required for the requisite level of performance and the transmission rate for each scheduled user at remote station 6. Each remote station 6 requires a different transmit energy-per-bit depending on the location of remote station 6 within the CDMA network and the channel condition. For example, remote station 6a (see FIG. 1) located near the cell site (e.g. close to base station 4c which is serving the cell) experiences less path loss and, therefore, may require less transmit energy-per-bit for the requisite level of performance. Conversely, remote station 6c located at the edge of the cell can require more transmit energy-per-bit for the same level of performance. For each scheduled user, the prior transmit power $p_{ij}$ and the prior transmission rate $R_{ij}$ are known at selector element 14 located within base station controller 10. These two measurements are used to calculate the prior energy-per-bit according to the equation $g_{ij}=p_{ij}/R_{ij}$. The average energy-per-bit, $g_{ij}$, can then be determined from a statistical averaging of $g_{ij}$. For example, the average energy-per-bit can be defined as the average of the last four calculated values of $g_{ij}$. Knowing the average energy-per-bit from the prior transmissions, channel scheduler 12 predicts the required transmit power, $p_{ij}$, for scheduled tasks for the upcoming scheduling period as $p_{ij}=g_{ij}\cdot R_{ij}$, where $R_{ij}$ is the assigned transmission rate for the scheduled task. Thus, the equation which channel scheduler 12 should satisfy when allocating resource becomes:

$$\hat{P}_{unscheduled,j} + \sum_{i=1}^{N_j} g_{i,j} \cdot R_{i,j} \leq P_{max,j} - P_{backoff}. \quad (4)$$

The forward link transmit power for data transmission to each remote station 6 is adjusted to maintain the requisite level of performance. The forward link power control mechanism can be implemented by one of numerous methods. As an example, for voice communication over the forward link, remote station 6 determines whether a code channel frame is received in error. If a frame error occurs, remote station 6 sends an error indicator bit (EIB) message back to the cell requesting an increase in transmit power. The cell then increases the transmit power until frame errors cease. Alternately, the cell can perform a statistical averaging of the frame error rate (FER) and vary the transmit power based on the FER. These two schemes can also be used for the forward link power control for transmission of the scheduled tasks. In a third scheme, demodulator 64 at remote station 6 performs the signal-to-noise calculation based on the measurement of the received signal. Remote station 6 then transmits a message to the cell requesting an increase or decrease in the transmit power based on the signal-to-noise calculation. The scope of the present invention is equally applicable to all methods which can be used to determine the required energy-per-bit for data transmission.

The discussion on the implementation and use of EIB transmission are disclosed in U.S. Pat. No. 5,568,483, entitled "METHOD AND APPARATUS FOR THE FORMATTING OF DATA FOR TRANSMISSION", assigned to the assignee of the present invention and incorporated by reference herein. Furthermore, the use of forward link power control is discussed in U.S. patent application Ser. No. 08/283,308, now U.S. Pat. No. 5,822,318, entitled "METHOD AND APPARATUS FOR CONTROLLING POWER IN A VARIABLE RATE COMMUNICATION SYSTEM", filed Jul. 29, 1994, U.S. patent application Ser. No. 08/414,633, now U.S. Pat. No. 6,055,209, entitled "METHOD AND APPARATUS FOR PERFORMING FAST FORWARD POWER CONTROL IN A MOBILE COMMUNICATION SYSTEM", filed Mar. 31, 1995, U.S. patent application Ser. No. 08/559,386, also entitled "METHOD AND APPARATUS FOR PERFORMING FAST FORWARD POWER CONTROL IN A MOBILE COMMUNICATION SYSTEM", filed Nov. 15, 1995, U.S. patent application Ser. No. 08/722,763, now U.S. Pat. No. 5,903,554, entitled "METHOD AND APPARATUS FOR MEASURING LINK QUALITY IN A SPREAD SPECTRUM COMMUNICATION SYSTEM", filed Sep. 27, 1996, and U.S. patent application Ser. No. 08/710,335, now U.S. Pat. No. 5,893,035, entitled "METHOD AND APPARATUS FOR PERFORMING DISTRIBUTED FORWARD POWER CONTROL", filed Sep. 16, 1996, which are assigned to the assignee of the present invention and incorporated by reference herein.

Channel scheduler 12 allocates the forward link resource for scheduled users in each cell such that equation (4) is satisfied for all cells in the network. The actual transmit power required for the unscheduled tasks during the upcoming scheduling period may be higher or lower than the predicted transmit power. The quality and efficiency of the communication depends on the accuracy of the prediction of the transmit power required during the present scheduling period. An erroneous prediction on the low side results in having inadequate power to transmit the additional forward link demand, e.g. increased demand due to increased voice activities, if the resource can not be reallocated. Conversely, a conservative prediction of the required transmit power on the high side results in under-utilization of the forward link. The accuracy of the prediction of the required transmit power for the unscheduled tasks is improved by making the prediction at a moment as close as possible to the time at which the prediction will be used.

Soft Handoff

At any given moment, it is possible that all remote stations 6 in a CDMA network are in soft handoff between cells. Each remote station 6 in soft handoff communicates with two or more cells simultaneously. The use of soft handoff in the CDMA system is discussed in detail in the aforementioned U.S. Pat. No. 5,267,261.

In allocating resource to remote station 6 in soft handoff, channel scheduler 12 ensures that each cell participating in the soft handoff satisfies the constraint of equation (4). At the start of each scheduling interval, selector elements 14 sends the active member set of each remote station 6 in the CDMA network to channel scheduler 12. The active member set contains the list of all cells in communication with remote station 6. In the exemplary embodiment, each cell in the active member set communicates with remote station 6 on the primary code channel. High speed data transmission over the secondary code channels can be accomplished through one or more cells in the active member set. Channel scheduler 12 first selects the cells which is to support the high speed data transmission. For each selected cell, channel scheduler 12 calculates the maximum allocated resource which can be supported by the cell. The maximum allocated resource from all selected cells in the active member set form a list of possible allocated resource. Since equation (4) should be satisfied for all selected cells, the minimum allocated resource from the list of maximum allocated resource satisfies the constraint of equation (4) for all cells. Thus, the maximum amount of resource which can be allocated to a particular remote station 6 is the minimum from the list of maximum allocated resource.

Code Channel Sets

The method and apparatus for the forward link rate scheduling of the present invention can be applied to any communication system capable of variable rate data transmission. For example, the present invention is applicable to a CDMA system, a GLOBALSTAR system, a time division multiple access (TDMA) system, or a frequency division multiple access (FDMA) system. The application of the present invention to a CDMA system or other variable rate communication systems, using the concept of code channel sets to be discussed below, or other embodiments, are within the scope of the present invention.

A CDMA system which conforms to the IS-95A standard uses quaternary phased shift keying (QPSK) spreading on the forward link. At base station 4, the same data stream is provided to both I and Q modulators. The modulated I and Q signals are combined and transmitted. At remote station 6, demodulator 64 demodulates the received signal into the I and Q components. The components are combined to obtain the demodulated output. Using QPSK spreading in this manner, the 1.2288 MHz system bandwidth for a CDMA system which conforms to the IS-95A standard contains 64 code channels, with each code channel capable of transmitting at 19.2Ksps symbol rate.

The number of code channel can be doubled by providing the I and Q modulators with different data streams at base station 4 and not combining the outputs from the I and Q modulators at remote station 6. In this mode, the I modulator is provided with one data stream and the Q modulator is provided with a second data stream at base station 4. At remote station 6, the I and Q components are decoded individually. Thus, the 64 code channels of the IS-95A CDMA system is doubled to 128 code channels.

Alternately, the number of code channels in the CDMA system can be increased by increasing the system bandwidth. For example, increasing the system bandwidth to 2.4576 MHz, e.g. by combining adjacent 1.2288 MHz wide frequency segments, can double the number of code channels. Furthermore, by doubling the system bandwidth and providing the I and Q modulators with different data streams, the number of code channel can be quadrupled. The present invention is applicable to a CDMA system, or any variable rate transmission system, regardless of the number of code channel.

Depending on the hardware implementation and system definition, the primary code channels and secondary code channels, which are described in detail below, can be defined from a common pool of code channels or can be distinct. For example, a system can contain 128 code channels, and each code channel can be used as a primary code channel or a secondary code channel depending on how the code channel is assigned. A code channel which has been assigned as a primary code channel is not assigned as a secondary code channel. Alternately, the primary and secondary code channels can be selected from distinct lists. For example, 64 primary code channels can be created from the I component of the QPSK modulated signal and 64 secondary code channels can be created from the Q component. The present invention is applicable regardless of how the primary and secondary code channels are defined.

The secondary code channels can be of various types, and each type can have the same or different transmission capacity as the primary code channel. For example, the secondary code channel can be comprised of code channels which have the same 19.2 Ksps transmission capacity as the primary code channel. Furthermore, the secondary code channels can be comprised of channels having high transmission capacity (e.g. over 19.2 Ksps) and capable of data transmission at variable rates. The present invention is applicable to channels of all type and transmission capacity.

The maximum transmission rate which can be assigned to the scheduled users is dependent on a number of considerations. The forward link capacity is limited and one of the system goals is to utilize all available capacity. In the simple case in which the CDMA network contains one cell and one remote station 6, the entire available capacity is allocated to remote station 6, whenever requested. This results in minimal transmission delay. In the more complicated situation, which also better reflects the actual CDMA network, many remote stations 6 compete for the available resource. Among the competing remote stations 6, channel scheduler 12 first allocates resource to remote station 6 having the highest priority. If a large portion of the available resource is allocated to this remote station 6, then a large number of remote station 6 wait in turn. Therefore, to satisfy the system goal of fairness in allocation of resources, the resource allocation is limited to a predetermined range.

In the present invention, data transmission from a cell to remote station 6 occurs over one or more code channels. The first code channel, referred to as the primary code channel, is assigned to remote station 6 during the call set up stage of a communication or during the call set up stage of a soft handoff with a cell. In the exemplary embodiment, the primary code channel has the characteristics of an IS-95A traffic channel and is a variable rate channel capable of transmission at rate $\frac{1}{8}$, $\frac{1}{4}$, $\frac{1}{2}$ and 1. Preferably, the primary code channel transmits at rate $\frac{1}{8}$ when idle and at rate 1 when transmitting data, although rate $\frac{1}{4}$ and $\frac{1}{2}$ can also be used. Rate $\frac{1}{8}$ can be used to transmit acknowledgments, requests for retransmission, and control bits, while rate 1 can be used to transmit data and control bits. The primary code channel is dedicated to remote station 6 for the duration of the communication with the cell. For transmission of large amounts of data to remote station 6, secondary code channels are assigned.

In the exemplary embodiment, data transmission occurs over the primary code channel as the cell receives the data. If the cell receives a large amount of data and channel scheduler 12 determines that additional code channels are required to transmit the data, channel scheduler 12 assigns secondary code channels. Channel scheduler 12 then conveys the identity of each of the assigned secondary code channel to selector element 14. Selector element 14 routes the information of the assigned secondary code channels to base station 4 serving the cell. The information is transmitted over forward link 50 on the primary code channel to remote station 6. In the exemplary embodiment, if each secondary code channel is capable of transmitting at a data rate of 9.6 Kbps, an assignment of 16 secondary code channels increases the data transmission rate to 163.2 Kbps {9.6 Kbps×17 code channels (or 1 primary code channel+16 secondary code channels)}. The use of secondary code channels for data transmission is disclosed in detail in U.S. Pat. No. 5,859,840. The assignment of secondary code channels can be accomplished by the following embodiments.

In the first embodiment, channel scheduler 12 can individually assign each secondary code channel. This embodiment offers the most flexibility in that channel scheduler 12 can assign any secondary code channel to any remote station 6. In the exemplary embodiment, the protocol used for identifying each assigned secondary code channel is the same as the protocol used for identifying the assigned traffic channel. In accordance to IS-95A, a unique 8-bit code is used to identify the assigned traffic channel. Therefore, each secondary code channel is identified by a unique 8-bit code and transmitted to remote station 6. As an example, if channel scheduler 12 assigns 16 secondary code channels, 128 bits is transmitted to remote station 6. Thus, almost $\frac{3}{4}$ of a code channel frame in overhead is needed to convey the identity of the assigned secondary code channels to remote station 6 (128 bits Π 172 bits/frame ☐ $\frac{3}{4}$ frame). This amount of overhead represents an inefficient use of the primary code channel.

In the second and preferred embodiment, the present invention is applied to a CDMA system using the concept of code channel sets. In this embodiment, the secondary code channels are grouped into channel sets labeled as Cm. In the exemplary embodiment, there are 16 channel sets associated with each primary code channel. Each channel set is defined by a 4-bit code and contains a unique set of zero or more secondary code channels. During the call set up stage of a communication with a cell or during the call set up stage of a soft handoff with additional cells, remote station 6 is assigned a primary code channel and sent the channel set definition associated with that primary code channel. The channel set definition identifies the secondary code channels for each of the 16 channel sets. During the data transmission stage, remote station 6 is sent the 4-bit code identifying the assigned channel set which is used in the subsequent data transmission.

Channel scheduler 12 can assign disjoint or overlapping channel sets to remote stations 6. For disjoint channel sets, no secondary code channel is assigned to more than one remote station 6 within the same cell. Thus, remote stations 6 which are assigned disjoint channel sets can simultaneously receive data transmission on the secondary code channels in the disjoint channel sets. For example, if the first remote station 6 on primary code channel 4 is assigned a channel set containing secondary code channels 33, 49, 65 and 81 and the second remote station 6 on primary code channel 6 is assigned a channel set containing secondary code channels 35, 51, 67 and 83, the data transmission can occur over those primary and secondary code channels concurrently.

Alternately, remote stations 6 can be assigned overlapping channel sets. For overlapping channel sets, at least one secondary code channel is assigned to more than one remote station 6 within the same cell. Remote stations 6 which are assigned overlapping channel sets can receive data transmission on the assigned channel sets at different times, using time multiplex. However, channel scheduler 12 can purposely assign overlapping channel sets and transmit the same data to multiple remote stations 6 simultaneously. For example, if the first remote station 6 on primary code channel 4 is assigned a channel set containing secondary code channels 33, 49, 65 and 81 and the second remote station 6 on primary code channel 6 is assigned a channel set containing secondary code channels 33, 51, 67 and 83, data transmission can occur over the secondary code channels assigned to the first remote station 6 at one time slot, T1, and data transmission can occur over the secondary code channels assigned to the second remote station 6 at a second time slot, T2. However, channel scheduler 12 can assign overlapping channel sets and transmit the same data to both remote stations 6 simultaneously. In the above example, the data to be sent to both remote stations 6 is transmitted on secondary code channel 33 which is common to both remote stations 6. In this case, both remote stations 6 can simultaneously receive data transmission on the overlapping channel sets.

As discussed above, secondary code channels can be of various types and each type can have various and/or varying transmission capacity. To simplify the discussion, the following discussion is focused on one type of secondary code channel having the same transmission capacity as the primary code channel. In the following embodiments, it is assumed that there are 128 code channels in the CDMA system.

An exemplary channel set definition for one primary code channel is illustrated in Table 1. As shown in Table 1, the primary code channel number 4 is associated with 16 unique channel sets labeled as C0 through C15. Each channel set contains zero or more secondary code channels. In the exemplary embodiment, C0 is reserved for the channel set containing zero secondary code channel and C15 is reserved for the channel set containing the largest number of secondary code channels. The definition of the channel set, e.g. the selection of the secondary code channels to be associated with each primary code channel, can be accomplished by one of a number of embodiments.

In the first embodiment, the secondary code channel associated with each primary code channel is obtained in a systematic manner. The first secondary code channel in the channel set is obtained by one of several methods. For example, the first secondary code channel can be an offset from the primary code channel or can be selected randomly. Subsequent secondary code channels are then selected based on an offset from the prior selected secondary code channel. For example, for channel set C15 in Table 1, the first secondary code channel is 25. 25 can be selected randomly or by an offset of 21 from primary code channel 4. The subsequent secondary code channel associated with primary code channel 4 is an offset from the prior secondary code channel by 8. Therefore, for primary code channel 4, the secondary code channels are 25, 33, 41, 49, 57, 65, 73, 81, 89, 97, 105 and 113. Likewise, for primary code channel 6, the secondary code channels are 27, 35, 43, 51, 59, 67, 75, 83, 91, 99, 107 and 115. The first embodiment offers a simple and efficient method of assigning secondary code channels while evenly distributing the secondary code channels across all primary code channels. Preferably, the first secondary code channel is selected such that there is an even distribution of the available secondary code channel, e.g. no secondary code channel is used more often than others.

TABLE 1

Channel Set Definition for Primary Code Channel 4

| Code Channel Set | Secondary Code Channels in the Channel Set (one member in the active member set) |
| --- | --- |
| C0 | — |
| C1 | 33 |
| C2 | 49 |
| C3 | 65 |
| C4 | 81 |
| C5 | 33, 49 |
| C6 | 65, 81 |
| C7 | 33, 49, 65, 81 |
| C8 | 97, 113 |
| C9 | 25, 41 |
| C10 | 57, 73 |
| C11 | 89, 105 |
| C12 | 25, 41, 57, 73 |
| C13 | 33, 49, 65, 81, 97, 113 |
| C14 | 25, 41, 57, 73, 89, 105 |
| C15 | 33, 49, 65, 81, 97, 113, 25, 41, 57, 73, 89, 105 |

In the second embodiment, a hashing function is used to define the secondary code channels associated with each primary code channel. The exemplary implementation of this embodiment is as follows. For the channel set definition shown in Table 1, twelve secondary code channels are associated with each primary code channel (see C15 in Table 1). Next, each secondary code channel in the forward link is listed twelve times in a hash list. For example, secondary code channel 1 is listed twelve times, secondary code channel 2 is listed twelve times, and so on. For each primary code channel, twelve secondary code channels are randomly selected from the hash list and place on channel set C15 for that primary code channel. The selected secondary code channel which is placed on C15 is removed from the hash list. In selecting the secondary code channels from the hash list, any secondary code channel which is identical to an earlier selected secondary code channel is placed back in the hash list and a new secondary code channel is randomly selected. If the primary code channels and the secondary code channels are derived from the same pool of code channels, a selected secondary code channel which is identical to the primary code channel is also placed back in the hash list. The twelve distinct secondary code channels which are selected and placed in C15 become the secondary code channels associated with that particular primary code channel. This process ensures that no primary or secondary code channels are identical. The process is then repeated for all primary code channels, except that the secondary code channels are selected from the same hash list which is continually dwindling. The hashing function randomly and evenly distributes the secondary code channels across all primary code channels. In assigning secondary code channels using the hashing function, care can be used such that the channel set can be disjoint or overlapping, depending on the desired characteristic of the channel sets.

In the third embodiment, the channel sets are defined such that all available secondary code channels are utilized in one channel set definition. Assuming that there are $2^m$ secondary code channels, the channel sets are defined such that data transmission can occur over 0, $2^0$, $2^1$, $2^2$, and up to $2^m$ secondary code channels. An exemplary implementation of this embodiment for a simple case of 8 secondary code channels is shown in Table 2. C0 contains the empty set. C1 through C8 each contains one secondary code channel, 0 through 7, respectively. C9 through C12 each contains two secondary code channels. The secondary code channels in C9 are combined with those in C10 and represented by C13. Likewise, the secondary code channels in C11 are combined with those in C12 and represented by C14. C15 contains the largest set, or all available secondary code channels.

The third embodiment requires $2^{m+1}$ channel sets to define $2^m$ secondary code channels and requires m+1 bits to convey the identity of the assigned channel set. For example, if the number of available secondary code channel is 128, then 256 channel sets are required and 8 bits is needed to identity the assigned channel set. Although the number of channel set may be large, the channel set definition is simple and need not be transmitted to remote station 6 during the set up stage of a call. This embodiment also allows all remote stations 6 in the same cell, or even the entire CDMA network, to utilize the same channel set definition and simplifies the transmission rate assignment process.

TABLE 2

Channel Set Definition using the Third Embodiment

| Code Channel Set | Secondary Code Channels in the Channel Set (one member in the active member set) |
| --- | --- |
| C0 | — |
| C1 | 0 |
| C2 | 1 |
| C3 | 2 |
| C4 | 3 |
| C5 | 4 |
| C6 | 5 |
| C7 | 6 |
| C8 | 7 |
| C9 | 0, 1 |
| C10 | 2, 3 |
| C11 | 4, 5 |
| C12 | 6, 7 |
| C13 | 0, 1, 2, 3 |
| C14 | 4, 5, 6, 7 |
| C15 | 0, 1, 2, 3, 4, 5, 6, 7 |

Other embodiments to define the channel sets associated with each primary code channel can be envisioned and are within the scope of the present invention. The present invention is applicable to any variable rate communication system using code channel sets regardless on how the channel sets are defined.

For simplicity, the same channel set definition can be used by all cells in the CDMA network. For example, all cells can define the channel set associated with primary code channel 4 as that shown in Table 1. Within the cell, each remote station 6 can have a unique channel set definition, depending on the assigned primary code channel. Therefore, the channel set definition for primary code channel 6 is different than that for primary code channel 4. The channel set definition described in the first and second embodiment are applicable to this implementation.

Alternately, all remote stations 6 in the same cell, or even the within the entire CDMA network, can have the same channel set definition. The channel set definition described in the third embodiment is applicable to this implementation. This implementation simplifies the forward link rate scheduling since only one channel set definition can be used for all remote stations 6 throughout the network. However, defining channel sets in this manner can limit the availability of secondary code channels to channel scheduler 12 and, therefore, increase the complexity of the forward link rate scheduling. The present invention is applicable to all channel set definition.

Without regard to how the channel sets are defined, in the first embodiment, channel scheduler 12 can assign any channel set for high speed data transmission between a cell and remote station 6. For example, remote station 6 can be in communication with three cells and can be assigned C3 by the first cell, C8 by the second cell, and C14 by the third cell. Thus, the scheduling information containing the assigned channel sets C3, C8, and C14 is transmitted to remote station 6 on the primary code channel. This implementation can require transmission of additional scheduling information since each cell can assign different channel sets. In the preferred embodiment, the same channel set is assigned by all cells in communication with remote station 6. The preferred embodiment requires less overhead bits to transmit the identity of the assigned channel set since only one needs to be transmitted. This restriction on channel sets assignment can limit the availability of secondary code channels and increase the complexity of the forward link rate scheduling.

When receiving data transmission, remote station 6 demodulates all secondary code channels in the channel set assigned to it. For example, if remote station 6 is assigned primary code channel 4 during the call set up stage of the communication with a cell and then assigned channel set C7 during a data transmission (see Table 1), remote station 6 demodulates secondary code channels 33, 49, 65, and 81, along with primary code channel 4, and reassembles the data portions of the code channel frames from those five code channels. Remote station 6 which is assigned channel set C0 only demodulates the data transmission on the primary code channel, since C0 contains the empty list.

During soft handoff, remote station 6 communicates with multiple cells. As an example, remote station 6 is assigned primary code channel 4 by one cell during the call set up stage of a communication. Subsequently, remote station 6 moves to another location and is assigned primary code channel 6 by a second cell. Remote station 6 then demodulates primary code channels 4 and 6 for communications with the two cells. If remote station 6 is then assigned channel set C7 (see Table 3) by both cells during a data transmission, remote station 6 demodulates the secondary code channels 33, 49, 65 and 81 from the first cell and the secondary code channels 35, 51, 67 and 83 from the second cell. Remote station 6 additionally demodulates the primary code channel 4 from the first cell and primary code channel 6 from the second cell.

TABLE 3

Channel Set Definition for Primary Code Channels 4 and 6

| Code Channel Set | Secondary Code Channels in the Channel Set (two member in the active member set) |
|---|---|
| C0 | — |
| C1 | (33, 35) |
| C2 | (49, 51) |
| C3 | (65, 67) |
| C4 | (81, 83) |
| C5 | (33, 35), (49, 51) |
| C6 | (65, 67), (81, 83) |
| C7 | (33, 35), (49, 51), (65, 67), (81, 83) |
| C8 | (97, 99), (113, 115) |
| C9 | (25, 27), (41, 43) |
| C10 | (57, 59), (73, 75) |
| C11 | (89, 91), (105, 107) |
| C12 | (25, 27), (41, 43), (57, 59), (73, 75) |
| C13 | (33, 35), (49, 51), (65, 67), (81, 83), (97, 99), (113, 115) |
| C14 | (25, 27), (41, 43), (57, 59), (73, 75), (89, 91), (105, 107) |
| C15 | (33, 35), (49, 51), (65, 67), (81, 83), (97, 99), (113, 115), (25, 27), (41, 43), (57, 59), (73, 75), (89, 91), (105, 107) |

Data is only transmitted on the secondary code channels when scheduled by channel scheduler 12. In the preferred embodiment, all secondary code channels are transmitted at full rate. Data transmission on the secondary code channel is more efficient than on the primary code channel because the primary code channel also carries overhead bits needed to support numerous features in the CDMA system.

In the preferred embodiment, the assigned channel set is communicated to remote station 6 over the primary code channel. At the start of the scheduling period, the cells transmit the identity of the channel set which is used for the subsequent data transmission. For 16 channel sets, only four bits are necessary to convey the identity of the assigned channel set. A protocol can be set up such that certain bits of the code channel frame on the primary code channel are reserved for the identity of the assigned channel set.

Retransmission of Code Channel Frame Errors

The identity of the assigned channel set is transmitted to remote station 6 and data transmission over the assigned secondary code channels occurs a predetermined number of frames later. Inevitably, the code channel frame on the primary code channel is sometimes received in error by remote station 6. When this occurs, remote station 6 does not know the identity of the assigned channel set. This problem can be remedied by one of at least four embodiments. In the following embodiments, it is assumed that there are two frames of processing delay between the receipt of the identity of the assigned channel set by the cell and data transmission over the assigned channel set. The identity of the assigned channel set is transmitted by the cell on the primary code channel at frame k and the data transmission over the assigned secondary code channels occurs at frame k+2. The following embodiments are also applicable wherein the processing delay between the receipt of the identity of the assigned channel set by the cell and data transmission over the assigned channel set is of different duration or is variable from frame to frame.

In the first embodiment, the cell retransmits the data corresponding to the time period for which the assigned channel set is not known by remote station 6. Remote station 6 transmits an EIB message to the cell indicating that code channel frame k on the primary code channel was received in error. The cell retransmits code channel frame k on the primary code channel and transmits code channel frames k+2 on the assigned secondary code channel at a later time, since remote station 6 does not know the assigned channel set at frame k+2.

In the second embodiment, if code channel frame k on the primary code channel is received in error, remote station 6 demodulates the data transmission at frame k+2 using the channel set identified in the prior code channel frame k−1. This embodiment does not work well if the channel set assigned at frame k−1 is different or disjoint from the channel set assigned at frame k. For example, referring to Table 1, if the channel set assigned at frame k−1 is C13 and the channel set assigned at frame k is C14, remote station 6 demodulating the data transmission at frame k using channel set C13 receives erroneous data.

In the third embodiment, if code channel frame k on the primary code channel is received in error, remote station 6 demodulates the data transmission at frame k+2 using the channel set with the largest number of secondary code channels. This embodiment works well if the largest channel set contains all secondary code channels which can be assigned to remote station 6. For example, C15 in Table 1 satisfies this condition since it contains all code channels in channel sets C0 through C14. The valid code channel frames are a subset of the demodulated code channel frames. The drawback with this embodiment is that more processing is required at remote station 6. Also, a large amount of data may have to be stored until remote station 6 can determine which ones of the demodulated code channel frames are valid. If each code channel frame is encoded with its own set of CRC bits, remote station 6 can determine the validity of the code channel frames by performing a CRC check on each demodulated code channel frame. Alternately, if the entire data frame is encoded with one set of CRC bits and the CRC bits are distributed across all code channel frames, remote station 6 can perform CRC check on different combinations of demodulated code channel frames. Finally, remote station 6 can store all demodulated code channel frames, notify the cell of the frame error on the primary code channel, and wait for retransmission of the identity of the assigned channel set, In the fourth and preferred embodiment, at frame k, the cell transmits the identity of the assigned channel set for frame k+2 along with the identity of the assigned channel set for frame k on the primary code channel. If code channel frame k is received in error, remote station 6 demodulates the data transmission at frame k+2 using the largest channel set, as in the third embodiment. However, since the identity of the channel set assigned for frame k+2 is also transmitted on the primary code channel at frame k+2, remote station 6 is able to determine which ones of the demodulated code channel frames are valid. An additional storage element of possibly one frame of data may be necessary until the assigned secondary code channels can be ascertained from the demodulated primary code channel. For a system which has 16 channel sets per primary code channel, transmitting the identity of the assigned channel set in the current frame requires only four additional bits.

Transmitting the identity of the assigned channel set over two code channel frames spaced two frames apart provides redundancy and time diversity. A data transmission is demodulated correctly unless the code channel frames k and k+2 on the primary code channel are both received in error. This is a low probability event.

Demodulation and Decoding Multiple Code Channels

The demodulation of multiple code channels during soft handoff and of multipath signals is described in detail in U.S. Pat. No. 5,109,390, entitled "DIVERSITY RECEIVER IN A CDMA CELLULAR TELEPHONE SYSTEM", assigned to the assignee of the present invention and incorporated by reference herein. The receiver disclosed in U.S. Pat. No. 5,109,390 is further extended by the present invention to receive multiple groupings of code channels.

Figure 4:
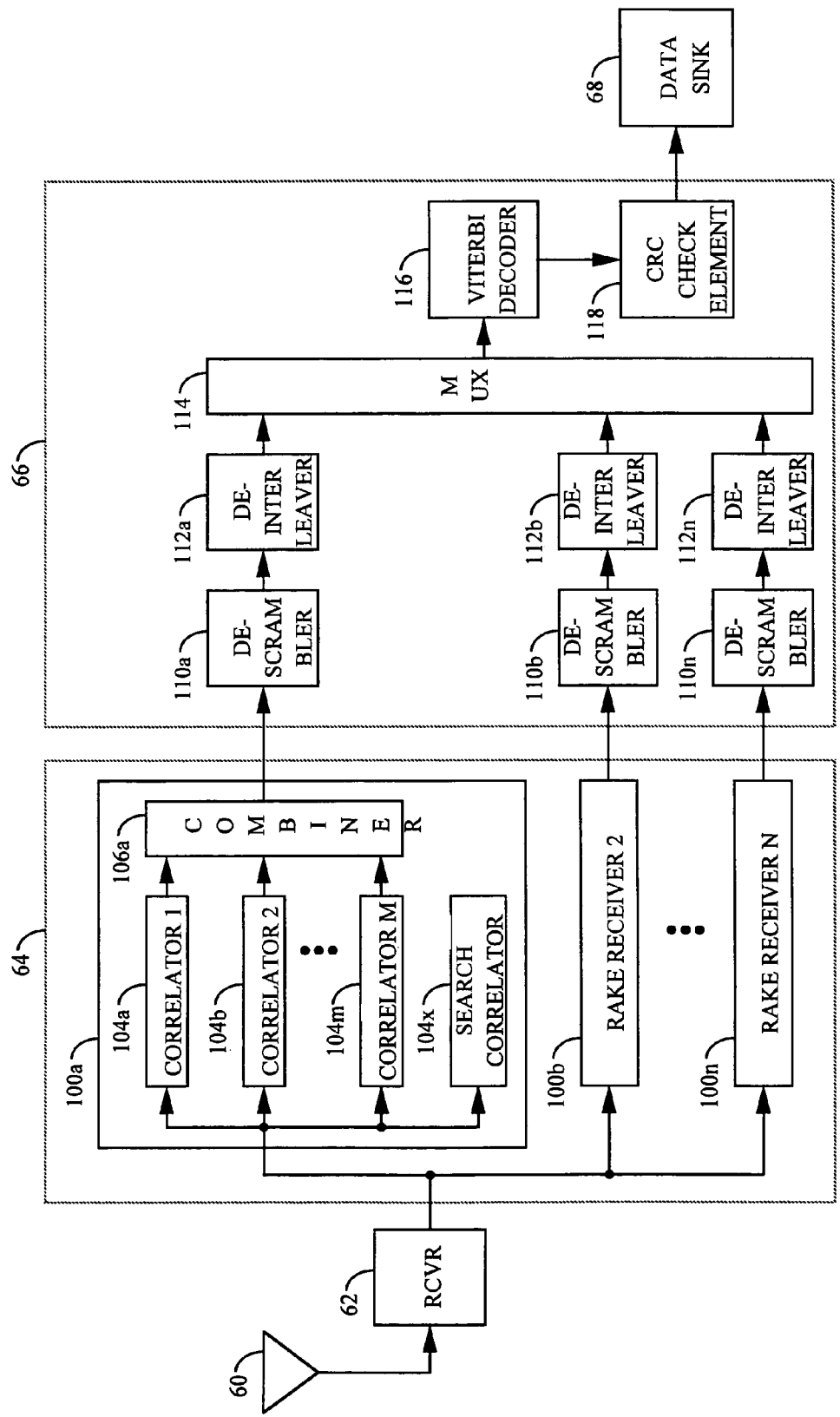
FIG. 4 is a block diagram of the exemplary receiver structure at the remote station.

An exemplary block diagram of demodulator 64 and decoder 66 in remote station 6 of the present invention is shown in FIG. 4. The RF signals transmitted from the cells are received by antenna 60 and provided to receiver 62. Receiver 62 amplifies and filters the received RF signal, downconverts the RF signal to baseband, and quantizes the baseband signal into digital bits. The digitized baseband signal is provided to demodulator 64. Demodulator 64 contains at least one rake receiver 100. Rake receivers 100 demodulate the digitized baseband signal with the proper short $PN_I$ and $PN_Q$ codes and the Walsh code in the manner described in detail in U.S. Pat. No. 5,109,390. The demodulated outputs from rake receivers 100 are provided to decoder 66. Within decoder 66, de-scramblers 110 descramble the demodulated outputs with the long PN code assigned to remote station 6. The de-scrambled data is then reordered by de-interleavers 112 and the de-interleaved data is routed through MUX 114 to Viterbi decoder 116. Viterbi decoder 116 convolutionally decodes the de-interleaved data and provides the decoded data to CRC check element 118. CRC check element 118 performs CRC check of the decoded data and provides the error free data portions of the received code channel frames to data sink 68.

Demodulator 64 can be implemented by many embodiments. In the first embodiment, one rake receiver 100 is required for each grouping of code channels being received by remote station 6. Each rake receiver 100 contains at least one correlator 104, with each correlator 104 referred to as a finger of rake receiver 100. At least one correlator 104 is required for each code channel in a grouping. Each correlator 104 has the capability to despread the digitized baseband signal from receiver 62 with unique short PN codes and a unique Walsh code assigned to that particular correlator 104 by remote station 6. The operations by correlator 104 mirror the operations performed at the transmitting cell. At the cell, the encoded data is first spread with the unique Walsh code assigned to the code channel on which the data is to be transmitted. The spread data is further spread by the unique short PN codes assigned to the particular transmitting cell.

Not all correlators 104 and not all rake receivers 100 within remote station 6 are in use at all times. In fact, only the outputs from correlators 104 which have been assigned by remote station 6 are combined by combiner 106. Furthermore, only the outputs from rake receivers 100 which have been assigned by remote station 6 are decoded by decoder 66. Correlators 104 and rake receivers 100 not assigned by remote station 6 are ignored. In fact, in the preferred embodiment, remote station 6 only demodulates and decodes the code channels which have been assigned to it and no other code channel. This feature is particularly important for remote station 6 which is a mobile unit because of the desire to conserve battery power and prolong the operating life of the unit.

Each assigned correlator 104 first despreads the digitized baseband signal from receiver 62 with the short PN codes assigned to that correlator 104 by remote station 6. The assigned short PN codes are identical to the short PN codes used to spread the data at the cell. Typically, the assigned short PN codes are time shifted from the short PN codes used at the cell to account for transmission delay through forward link 50 and processing delay by receiver 62. Correlator 104 subsequently despreads the output from the first despread operation with the Walsh code assigned to that correlator 104 by remote station 6. The assigned Walsh code corresponds to the Walsh code assigned to the code channel being demodulated by correlator 104. The despread bits from each assigned correlator 104 within the same rake receiver 100 are combined by combiner 106 and provided to decoder 66.

In the second embodiment, one rake receiver 100 can be used to demodulate all code channels assigned to remote station 6. This requires buffering of the digitized baseband signal from receiver 62. Rake receiver 100 then demodulates one code channel frame at a time and provides the demodulated outputs to decoder 66. This embodiment requires rake receiver 100 to operate at higher speed than rake receiver 100 of the first embodiment. In fact, each factor of twofold increase in speed allows a reduction of half the rake receivers 100.

Decoder 66 receives the demodulated outputs from rake receivers 100 and performs a number of operations which are complementary to the operations performed at the transmitting cell. Decoder 66 can be implemented by many embodiments. In the first embodiment, the demodulated output from each rake receiver 100 is provided to a separate de-scrambler 110. De-scrambler 110 despreads the demodulated output with a long PN code which has been assigned to remote station 6 and provides the de-scrambled data to de-interleaver 112. De-interleaver 112 reorders the bits in the de-scrambled data in the inverse order performed at the transmitting cell. The de-interleaving function provides time diversity, which improves the performance of the subsequent convolutional decoding, by spreading the bursts of errors introduced by transmission on forward link 50. The de-interleaved data is multiplexed through MUX 114 and provided to Viterbi decoder 116. Viterbi decoder 116 convolutionally decodes the de-interleaved data and provides the decoded data to CRC check element 118. CRC check element 118 performs CRC check of the decoded data and provides the error free data portions of the received code channel frames to data sink 68. In the preferred embodiment, one Viterbi decoder 116 is used to decode the data transmitted on all code channels.

In the second embodiment, the demodulated outputs from rake receivers 100 are multiplexed through MUX 114 and processed by one de-scrambler 110, one de-interleaver 112, and one Viterbi decoder 116. Using one set of hardware to decode all code channel frames minimizes the hardware requirement. Again, time multiplexing of the hardware requires the hardware to operate at higher speed.

In the present invention, demodulator 64 is used in one of at least four different modes. In the first mode, demodulator 64 is used to demodulate the signal transmitted from one cell through one code channel. In this mode, only one rake receiver 100 is used to demodulate the received signal. Within the assigned rake receiver 100, a different correlator 104 is assigned to each of the multipaths of the received signal. The short PN codes and the Walsh code used by each of the assigned correlators 104 are the same. However, the short PN codes used by each assigned correlator 104 has a different time offset to compensate for the different delay of each multipath. Search correlator 104x continuously searches for the strongest multipath which has not been assigned a correlator 104. Search correlator 104x informs remote station 6 when the signal strength of the newly discovered multipath exceeds a predetermined threshold. Remote station 6 then assigns the newly discovered multipath to one correlator 104.

As an example, remote station 6 communicates with one cell through primary code channel 4. Remote station 6 can assign primary code channel 4 to rake receiver 100a. Within rake receiver 100a, correlators 104 are assigned to different multipaths of the signal received on primary code channel 4. For example, correlator 104a can be assigned to the first multipath, correlator 104b can be assigned to the second multipath, and so on. The outputs from the assigned correlators 104 are combined by combiner 106a and provided to decoder 66. Within decoder 66, the demodulated output from rake receiver 104a is de-scrambled by de-scrambler 110a, reordered by de-interleaver 112a, routed through MUX 114, convolutionally decoded by Viterbi decoder 116, and checked by CRC check element 118. The error free data portions from CRC check element 118 are provided to data sink 68.

In the second mode, demodulator 64 is used to demodulate the signals transmitted from multiple cells through one grouping of multiple code channels. This situation occurs for remote station 6 in soft handoff. In this mode, the entire grouping is assigned to one rake receiver 110. Each code channel in the grouping is assigned to at least one correlator 104 in rake receiver 100. Each correlator 104 despreads the baseband output from receiver 62 with the unique short PN codes and the unique Walsh code corresponding the cell and the code channel, respectively, to which the particular correlator 104 is assigned. The outputs from the assigned correlators 104 are combined by combiner 106. The combined signal improves the estimate of the data redundantly transmitted over the multiple code channels in the grouping.

As an example, remote station 6 is in soft handoff and communicates with the first cell through primary code channel 4 and the second cell through primary code channel 6. Remote station 6 assigns at least one correlator 104 of the same rake receiver 100 to each of the two primary code channels 4 and 6. For example, remote station 6 can assign correlator 104a to primary code channel 4 and correlator 104b to primary code channel 6. Correlators 104c through 104m can be assigned by remote station 6 to the strongest multipaths of primary code channels 4 and 6. The estimate from the assigned correlators 104 are combined by combiner 106a to provide an improved data estimate which is provided to decoder 66. Decoder 66 decodes the demodulated data from rake receiver 100a in the same manner as described in the first mode.

In the third mode, demodulator 64 is used to demodulate the signals transmitted from one cell through multiple groupings of code channels. This situation occurs when the cell is transmitting data to remote station 6 at the high data transmission rate. Each grouping consists of one code channel. In this mode, one rake receiver 100 is assigned to each grouping of code channel. Correlators 104 within the same rake receiver 100 are assigned the same short PN codes and the same Walsh code. Correlators 104 within different rake receivers 100 are assigned the same short PN codes but different Walsh code, since each rake receiver 100 is demodulating a different code channel.

Each rake receiver 100 performs the same function in this mode as in the first mode. Essentially, the code channel in each grouping is assigned to at least one correlator 104. Correlators 104 in the same rake receiver 100 are assigned to different multipaths of the signal received on the code channel assigned to that particular rake receiver 100. Therefore, each correlator 104 within the same rake receiver 100 uses the same short PN codes and the same Walsh code. The short PN codes for each assigned correlator 104 within the same rake receiver 100 are time shifted to account for the different delays of the multipaths. The outputs from the assigned correlators 104 in each rake receiver 100 are combined by combiner 106 and provided to decoder 66.

As an example, remote station 6 is assigned primary code channel 4 during the call set up stage of a communication with a cell and then assigned channel set C7 during a period of high speed data transmission. Referring to Table 1, code channel set C7 contains the four secondary code channels 33, 49, 65 and 81. Remote station 6 assigns five different rake receivers 100 to the five code channels. For example, remote station 6 can assign rake receiver 100a to primary code channel 4, rake receiver 100b to secondary code channel 33, rake receiver 100c (not shown in FIG. 4) to secondary code channel 65, and so on. Within rake receiver 100a, correlators 104 are assigned to different multipaths of the signal received on primary code channel 4. For example, correlator 104a can be assigned to the first multipath, correlator 104b to the second multipath, and so on. The outputs from the assigned correlators 104 are combined by combiner 106a. The demodulated outputs from the five assigned rake receivers 100 are provided to decoder 66.

Within decoder 66, the demodulated output from rake receiver 100a is de-scrambled by de-scrambler 110a and reordered by de-interleaver 112a. Likewise, the demodulated output from rake receiver 100b is de-scrambled by de-scrambler 110b and reordered by de-interleaver 112b. Five separate de-scrambler 110 and de-interleaver 112 combinations are assigned to each of the five demodulated outputs from the five rake receivers 100. The de-interleaved data from the five de-interleavers 112 is multiplexed through MUX 114 in a predetermined order and provided to Viterbi decoder 116. The de-interleaved data is convolutionally decoded by Viterbi decoder 116, and checked by CRC check element 118. The error free data portions from CRC check element 118 are provided to data sink 68.

In the fourth mode, demodulator 64 is used to demodulate the signals transmitted from multiple cells through multiple groupings of code channels. This situation occurs for remote station 6 in soft handoff with multiple cells and receiving data at the high data transmission rate from multiple cells. Each grouping consists of more than one code channel. In this mode, one rake receiver 100 is assigned to each grouping of code channels. Each rake receiver 100 performs the same functions in this mode as in the second mode. Within the same rake receiver 100, at least one correlator 104 is assigned to each of the code channels in the grouping. Each correlator 104 uses unique short PN codes and a unique Walsh code corresponding to the cell and the code channel, respectively, to which the particular correlator 104 is assigned.

As an example, remote station 6 communicates with the first cell through primary code channel 4 and the second cell through the primary code channel 6 during a soft handoff. During a subsequent high data transmission, remote station 6 is assigned channel set C7. Referring to Table 3, C7 contains the four groupings of secondary code channels (33, 35), (49, 51), (65, 67) and (81, 83). Remote station 6 assigns five different rake receivers 100 to the five groupings of code channels. For example, remote station 6 can assign rake receiver 100a to the first grouping of primary code channels (4, 6), rake receiver 100b to the second grouping of secondary code channels (33, 35), rake receiver 100c (not shown in FIG. 4) to the third grouping of secondary code channels (49, 51), and so on. Within rake receiver 100a, at least one correlator 104 is assigned to each code channel in the grouping. For example, remote station 6 can assign correlator 104a to primary code channel 4 and correlator 104b to primary code channel 6. Correlators 104c through 104m can be assigned by remote station 6 to the next strongest multipaths of primary code channels 4 and 6. The outputs from the assigned correlators 104 within rake receiver 100a are combined by combiner 106*a*. The demodulated outputs from the five assigned rake receivers 100 are provided to decoder 66.

Decoder 66 receives the demodulated outputs from the five rake receiver 100 and decodes the data in the same manner as described for the third mode. Essentially, the demodulated output from each of the five rake receivers 100 is de-scrambled by a separate de-scrambler 110, reordered by a separate de-interleaver 112, multiplexed through MUX 114, convolutionally decoded by Viterbi decoder 116, and checked by CRC check element 118. The error free data portions from CRC check element 118 are provided to data sink 68.

The above discussion on the demodulation and decoding of data transmission over multiple groupings of code channels can be extended to a remote station in soft handoff with three or more base stations. In essence, each grouping of code channels requires a separate rake receiver 100. For example, the four groupings of secondary code channel in channel set C7 (see Table 3) requires four rake receivers 100. Furthermore, each code channel in a grouping is assigned to at least one different correlator 104 in the same rake receiver 100. The output from the assigned correlator 104 are combined and decoded to obtain the data transmitted on that grouping of code channels.

The exemplary demodulator 64 and decoder 66 hardware shown in FIG. 4 can be used in other modes. For example, demodulator 64 and decoder 66 can be configured to demodulate and decode data transmitted on multiple groupings of code channels wherein each grouping contains one code channel and the data is not transmitted from the same cell. This is similar to the third mode described above but rake receivers 100 are assigned different short PN code corresponding to the different transmitting cells. Alternately, demodulator 64 and decoder 66 can be configured to demodulate and decode data transmitted on multiple groupings of code channels wherein each grouping contains a different number of code channels. This is a variation of the fourth mode described above. These and other modes of use of demodulator 64 and decoder 66 can be contemplated and are within the scope of the present invention.

CRC Bits

In accordance with IS-95A, the CRC bits are appended to each data portion to allow detection of frame error by remote station 6. The CRC bits are generated in accordance with the CRC polynomial specified by IS-95A. Specifically, for a data transmission rate of 9.6 Kbps, the specified polynomial is $g(x)=x^{12}+x^{11}+x^{10}+x^9+x^8+x^4+x+1$. For each data portion, twelve CRC bits are appended. In the present invention, the number of CRC bits can be increase or decrease, depending on the required detection certainty. More CRC bits allows detection of frame error with greater certainty but requires more overhead. Conversely, less CRC bits decreases the certainty of frame error detection but requires less overhead.

In the present invention, wherein high speed data transmission occurs over multiple code channels, the CRC bits for the multiple code channels can be generated by at least two embodiments. In the first embodiment, each data portion is appended with its own set of CRC bits, similar to the IS-95A standard. This embodiment requires more overhead but allows detection of frame error on each individual data portion. Only the data portion received in error is retransmitted.

In the second embodiment, the data frame which is to be transmitted over the assigned code channels within one frame is encoded by one CRC generator. The generated CRC bits can be transmitted in one of several modes. In the first mode, the data frame is partitioned into data portions as described above. The CRC bits are also partitioned and appended to each data portion. Thus, each code channel frame contains a data portion and some CRC bits. In the second mode, the CRC bits are transmitted over one code channel frame. All code channel frames, except the last code channel frame, contain only the data portion. The last code channel frame contains the CRC bits and some data. The second mode provides time diversity of the CRC bits and improves frame error detection by remote station 6.

At remote station 6, the data portion of the code channel frames and the CRC bits are reassembled. In the second embodiment, remote station 6 is only able to determine whether all code channel frames are received correctly or whether one or more frame error has occurred. Remote station 6 is not able to determine which ones of the code channel frames are received in error. Therefore, a frame error indication dictates that all code channel frames for that frame need to be retransmitted by the cell. The second embodiment has the advantage of using a smaller number of CRC bits for the data frame.

As an example, assume that high speed data transmission occurs over twelve code channels. In the first embodiment, each of the twelve data portions is appended with its own set of twelve CRC bits. A total of 144 CRC bits is required for the twelve data portions. These 144 CRC bits allow detection of frame error on each individual code channel frame. Therefore, if the code channel frame on a particular code channel is received in error, only the error frame needs to be retransmitted.

For the second embodiment, the entire data frame is encoded with one set of CRC bits. Preferably, the number of CRC bits used is less than the total number of CRC bits used in the first embodiment. In the example shown above, for twelve code channel frames, the number of CRC bits used is at least 12 but less than 144 Since there are approximately twelve times more data bits, more CRC bits is required to allow detection of frame error with greater certainty. Assuming that 24 CRC bits allows detection of frame error with the requisite level of certainty, the 24 CRC bits can be partitioned into twelve CRC blocks, with each CRC block containing two CRC bits. One CRC block is appended to each of the twelve data portions. Alternately, the 24 CRC bits can be transmitted over one code channel frame. At remote station 6, the data portions and the 24 CRC bits are reassembled. Remote station 6 is only able to determine whether all twelve code channel frames are received correctly. If a frame error is indicated, remote station 6 is not able to determine which ones of the code channel frames are received in error. Therefore, all twelve code channel frames are retransmitted by the cell. For a saving of 120 CRC bits in overhead, remote station 6 is still able to detect frame error, but without the precision of the first embodiment. The second embodiment requires a tradeoff between less overhead and redundant retransmission of code channel frames.

Timing of the Forward Link Rate Scheduling

The accuracy of the prediction of the required transmit power for the unscheduled tasks is improved by making the prediction at a moment as close as possible to the time at which the prediction will be used. During the period of delay, from the time of the prediction to the time of the actual use, the status of the network may have changed. For example, the voice users may have started or stopped talking, users may have been added or dropped from the network, or the channel conditions may have changed. By limiting the processing delay to a small number of frames, the prediction of the required transmit power for the unscheduled tasks is sufficiently accurate for the present invention. In the preferred embodiment, the processing delay is four frames or less.

Channel scheduler 12 can make predictions at a short time interval, e.g. by maintaining a short scheduling interval, to improve the accuracy of the predictions and allow channel scheduler 12 to quickly respond to changes in the forward link demand. In the exemplary embodiment, the prediction is made every frame, the resource is allocated or reallocated every frame, and the schedule of the assigned transmission rates is transmitted to remote stations 6 at each frame.

Figure 8:
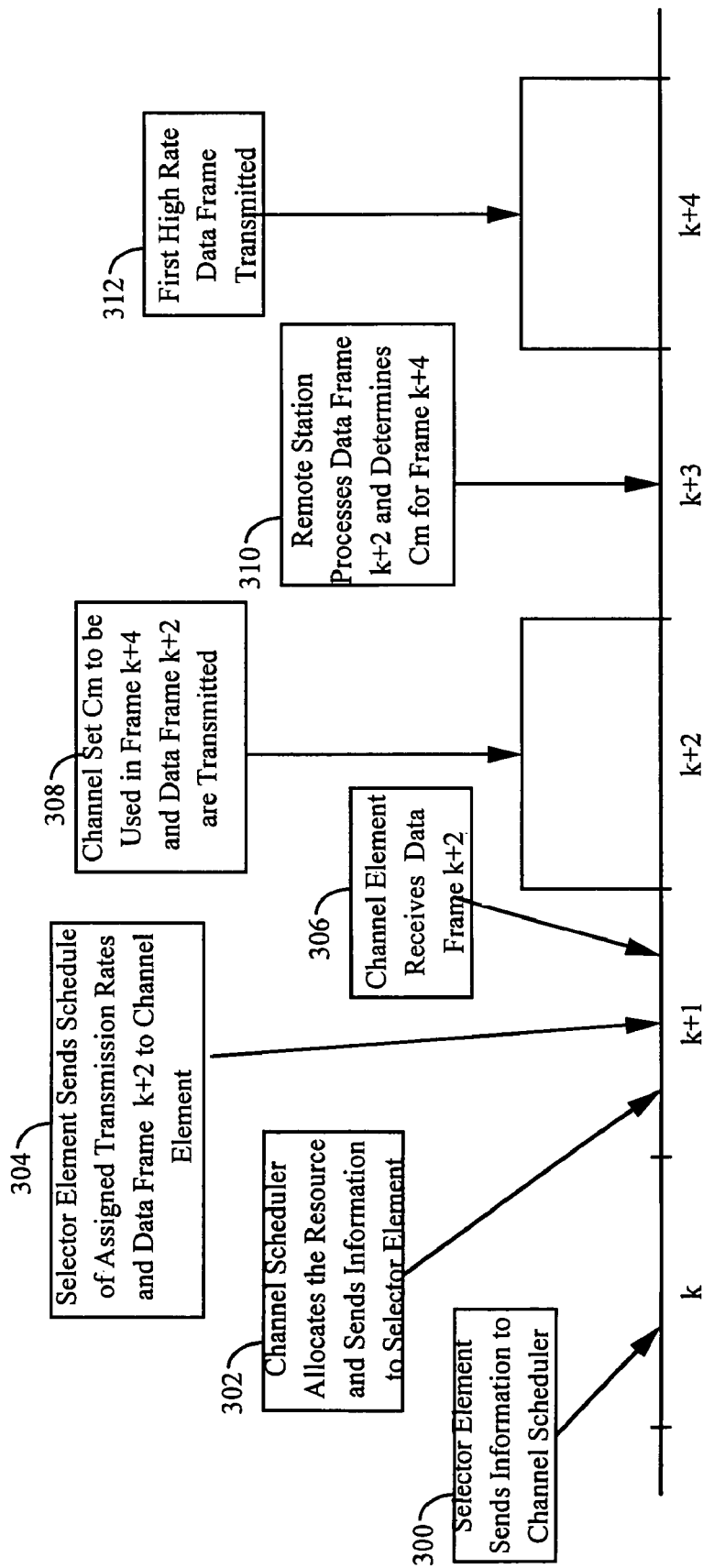
FIG. 8 is a timing diagram showing the transmission rate assignment and the data transmission at the assigned transmission rate.

An exemplary illustration of the timing diagram of the forward link rate scheduling of the present invention is shown in FIG. 8. At frame k, the status of the entire CDMA network is measured and sent to channel scheduler 12 at block 300. In the exemplary embodiment, the status of the CDMA network may include the total residual power available for scheduled tasks at each cell, the amount of data to be transmitted to each scheduled user, the active member set of each remote station 6, the transmit energy-per-bit of each scheduled user, and the code channels available for transmission for each cell. At frame k+1, channel scheduler 12 allocates the resource and sends the information to selector element 14 located within base station controller 10 at block 302. The resource allocation by channel scheduler 12 can be in the form of an assigned transmission rate or an allocated transmit power. If channel scheduler 12 allocates a transmit power, selector element 14 computes an assigned transmission rate based on the allocated transmit power and the required energy-per-bit of remote station 6. The assigned transmission rates are to be utilized at frame k+4. Within frame k+1, selector element 14 sends the schedule of the assigned transmission rate and the data frame, which is to be transmitted at frame k+2, to channel element 40 at block 304. Also within frame k+1, channel element 40 receives the schedule of assigned transmission rate and the data frame from selector element 14 at block 306. At frame k+2, channel element 40 transmits the identity of the assigned channel set for frame k+4 and for frame k+2 to remote station 6 on the primary code channel at block 308. During frame k+3, remote station 6 receives the data frame and determines the identity of the assigned channel set at block 310. Remote station 6 then reconfigures the hardware, if necessary, for receiving the forthcoming high speed data transmission. At frame k+4, the data is transmitted over the primary and secondary code channels assigned to remote stations 6 at block 312.

In the exemplary embodiment, the processing delay between the time the necessary information from the cell is received by channel scheduler 12 to the time of data transmission at the assigned transmission rate is four frames. At frame k, channel scheduler 12 receives the information from the cell. At frame k+4, the cell transmits the data on the assigned primary and secondary code channels to remote stations 6. For a CDMA system which conforms to the IS-95A standard, each frame of delay represents a 20 msec delay. In the exemplary embodiment, the four frames of processing delay represents 80 msec of delay. This period of delay is short enough so that the prediction of the required transmit power is moderately accurate and the communication on the forward link is not significantly degraded. Furthermore, the initial prediction of the required transmit power for the unscheduled tasks is not overly critical in the present invention because of the ability of channel scheduler 12 to continuously monitor the forward link usage and dynamically reallocate the resource for the scheduled tasks.

The above description of the exemplary embodiment represents one implementation of the present invention. Other variations in the timing of the forward link rate scheduling routine from that described above can be contemplated and are within the scope of the present invention.

The scheduling information containing the assigned transmission rates can be transmitted to remote stations 6 in one of a number of embodiments. In the first embodiment, certain bits in the code channel frame on the primary code channel is reserved for the scheduling information. In the second embodiment, the scheduling information is transmitted by the use of separate signaling messages. The signaling message can be transmitted to remote station 6 whenever there is a new assignment of a data transmission rate. Other embodiments to transmit the scheduling information using variations or combination of the above described embodiments can be contemplated and are within the scope of the present invention.

Figure 9:
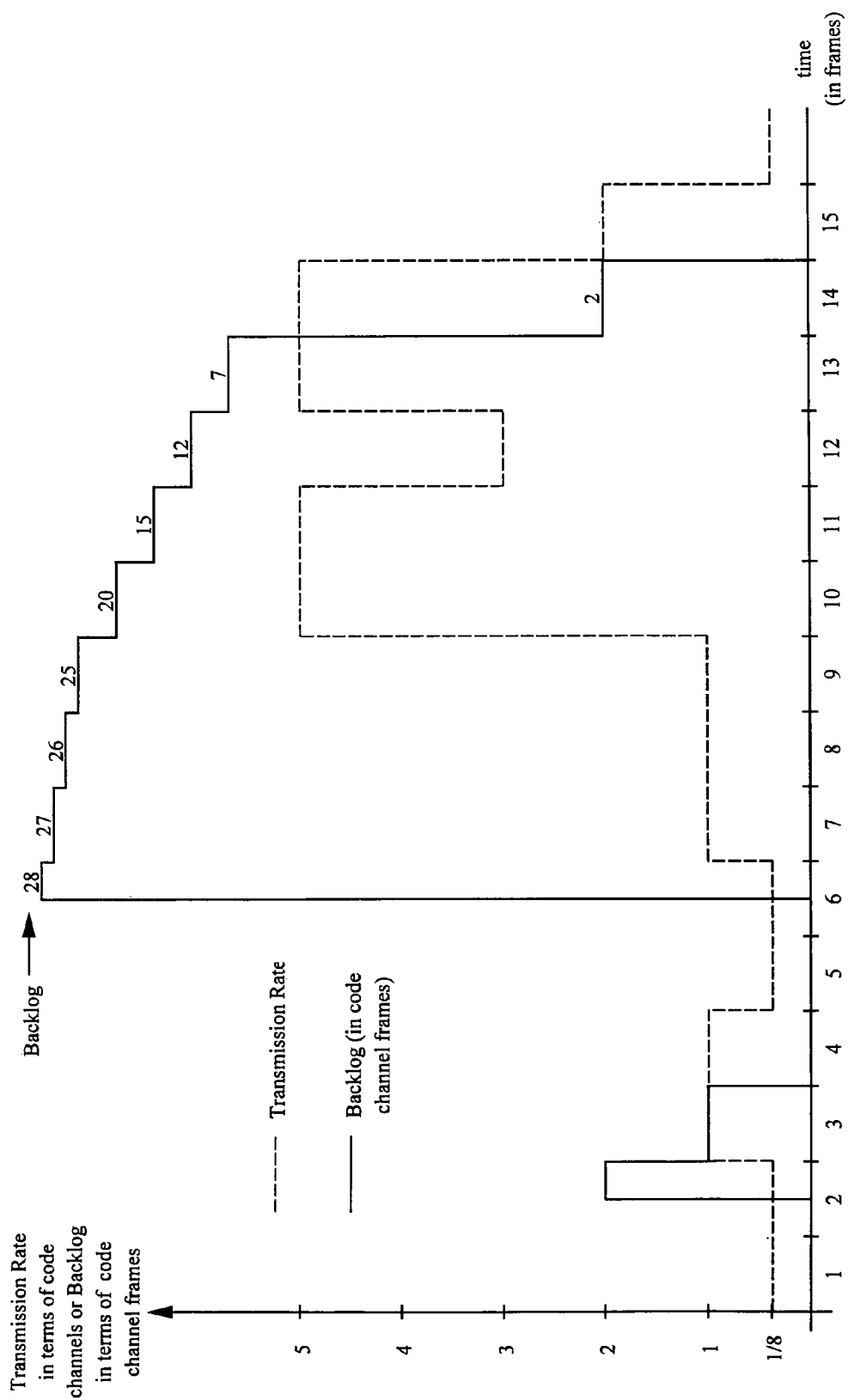
FIG. 9 is a diagram showing an exemplary utilization of the forward link rate scheduling of the present invention.

An exemplary diagram of the forward link rate scheduling and high speed data transmission of the present invention is shown in FIG. 9. As discussed above, remote station 6 is assigned a primary code channel for the duration of the communication with the cell. In FIG. 9, the primary code channel transmits at rate ⅛ when idle and at rate 1 when transmitting data. The backlog of the data to be transmitted to remote station 6 is represented by the solid line and given in terms of the number of code channel frames. The number of code channel frames equals to the number of code channels times the number of frames necessary to send all the data. For example, 20 code channel frames can be transmitted by one code channel over 20 frames or by four code channels over five frames. Although the capacity of the primary code channel is slightly less than that of the secondary code channel, because of the overhead bits in the primary code channel, the difference is ignored in the following example for simplicity. The following discussion pertains to the earlier described embodiment wherein the forward link rate scheduling is performed every frame. The following example also applies to the embodiment wherein the forward link rate scheduling is performed every K frames.

In the example shown in FIG. 9, remote station 6 is assigned a primary code channel but the cell has no data to transmit to remote station 6 at frames 1 and 2. Therefore, the cell transmits at rate ⅛ over the primary code channel. During frame 2, the cell receives two code channel frames for transmission to remote station 6. The cell transmits one code channel frame at frames 3 and 4, on the primary code channel, to bring the backlog to zero at the end of frame 3. Note that there is no scheduling delay in data transmission over the primary code channel. The data received during frame 2 is transmitted immediately on the primary code channel at frame 3. Immediate transmission on the primary code channel allows the signaling from the cell to remote station 6 to get through quickly. For example, the TCP acknowledgment requires approximately 40 bytes and, with header compression, can be fitted into one code channel frame. The TCP acknowledgment can be transmitted immediately over the primary code channel within one frame.

During frames 5 and 6, the cell transmits at rate ⅛ while idle and waiting for data. During frame 6, the cell receives a large amount of data to transmit to remote station 6. At frame 7, channel scheduler 12 receives the queue size information from selector element 14, collects other information pertaining to the status of the network (e.g. the total residual power available for transmission of scheduled tasks from each of the cells), allocates the resource, and conveys the information to selector element 14. In this example, channel scheduler 12 assigns channel set C7 from Table 1 which contains four secondary code channels. At frame 8, the cell transmits the second code channel frame from the queue along with the assigned channel set to remote station 6 on the primary code channel. At frame 9, base station 4 continues to transmit data on the primary code channel and brings the backlog down to 25 code channel frames. During frame 9, remote station 6 receives the second code channel frame and the identity of the assigned channel set and configures its hardware to receive the forthcoming high speed data transmission. The high speed data transmission occurs over the primary code channel and the four secondary code channels at frames 10 and 11.

In this example, the demand for the forward link by the unscheduled tasks increases during frame 8. At frame 9, channel scheduler 12 allocates the resource for the scheduled tasks having less available forward link capacity. Channel scheduler 12 determines that channel set C6 with two fewer secondary code channels can be used to free up some capacity for the additional demand. At frame 10, the new channel set containing two secondary code channels is transmitted to remote station 6. At frame 11, remote station 6 receives the new channel set. And at frame 12, the cell transmits data over the new channel set.

Also, in this example, the demand for the forward link by the unscheduled tasks decreases during frame 9. During frame 10, having more forward link capacity, channel scheduler 12 assigns channel set C7 with four secondary code channels to remote station 6. At frame 11, the identity of the new channel set is transmitted to remote station 6. At frame 12, remote station 6 receives the identity of the new channel set. And at frame 13, the cell transmits data over the new channel set.

During frame 12, channel scheduler 12 realizes that the queue will be empty when the current scheduled transmission is complete and that only two code channels are needed to transmit the remaining data at frame 15. At frame 13, channel scheduler 12 directs the cell, through selector element 14, to transmit the identity of the new channel set C3, which contains only one secondary code channel, to remote station 6. At frame 14, remote station 6 receives the identity of the new channel set and reconfigures its hardware. And at frame 15, the cell transmits the two remaining code channel frames over the new channel set.

Realizing that the queue is nearly empty, at frame 13, channel scheduler 12 directs the cell, through selector element 14, to send the identity of the new channel set C0, which contains zero secondary code channels. At frame 16, the new channel set is utilized by the cell. Having transmitted all the data, the cell transmits at rate ⅛ on the primary code channel at frame 16 while idle and waiting for more data.

The above example shows that there are four frames of processing delay between the time data is made available to the cell (at frame 6 in FIG. 9) and the high speed data transmission (at frame 10 in FIG. 9). The example also illustrates that the transmission rate can be adjusted at each frame such that the forward link is fully utilized at each frame.

Figure 10:
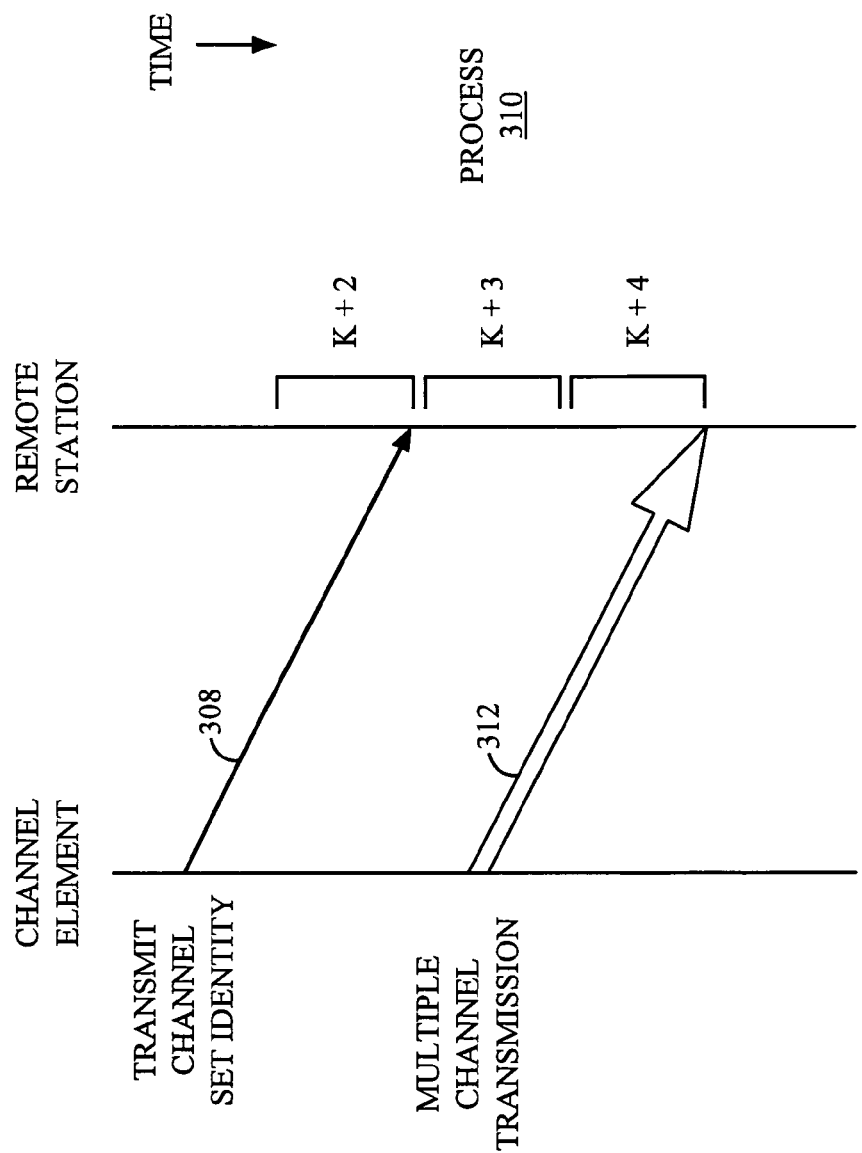
FIG. 10 is another view of the timing diagram of FIG. 8.

FIG. 10 is another view of the timing diagram of FIG. 8, and is self-explanatory.

Priority Assignment

In order to optimize utilization of the forward link, the resource for the scheduled tasks is allocated to remote stations 6 in accordance with the priority of remote stations 6. The forward link transmit power is assigned first to remote station 6 having the highest priority and last to remote station 6 having the lowest priority. Numerous factors can be used to determine the priority of remote station 6. The following discussion details an exemplary list of some of the factors which can be considered in assigning priority. Other factors can also be considered and are within the scope of the present invention.

An important factor in determining priority among remote stations 6 is the energy-per-bit required to transmit to remote station 6. Remote station 6 located at the edge of a cell or those experiencing adverse channel condition requires more energy-per-bit for the requisite level of performance because of the greater transmission loss from the cell to remote station 6 and/or higher Eb/No. Conversely, remote station 6 located close to the cell site (e.g. close to base station 4 which is serving the cell) requires less energy-per-bit for the same level of performance. In fact, for the same amount of transmit power, the symbol rate which can be transmitted to remote station 6 is inversely proportional to the transmission loss and Eb/No. As an example, the total residual power which supports data transmission at 38.4 Kbps to the first remote station 6 can only support data transmission at 9.6 Kbps to the second remote station 6 (¼ the symbol rate) if the transmission loss to the second remote station 6 is approximately 6 dB more than that of the first remote station 6, or if the second remote station 6 requires 6 dB higher Eb/No than the first remote station 6. It is preferable to transmit first to remote station 6 which requires less energy-per-bit because less resource is consumed for a given transmission rate.

Referring to FIG. 1, remote stations 6a and 6b are closer to base station 4c than remote station 6c. Likewise, remote stations 6d and 6e are closer to base station 4d than remote station 6c. Thus, better utilization of the forward link is made by first transmitting to remote stations 6a, 6b, 6d and 6e, at time slot T1, and later transmitting to remote station 6c, at time slot T2. Generally, it is preferable to assign a higher priority to remote station 6 which requires less energy-per-bit to maintain the communication link.

Remote station 6 can be in soft handoff with multiple cells. Remote station 6 in soft handoff can consume more resource if multiple cells transmit to remote station 6 simultaneously. Also, remote station 6 in soft handoff is typically located near the edge of the cell and requires more energy-per-bit. Therefore, higher throughput on the forward link may be obtained by assigning a low priority to remote station 6 which is in soft handoff.

The optimal allocation of resource is also dependent on the amount of data to be transmitted to remote station 6. The data to be transmitted is stored in a queue located within selector element 14. Thus, the size of the queue is indicative of the amount of data to be transmitted. At the start of each scheduling interval, the queue size of all scheduled tasks is sent to channel scheduler 12. If the queue size of a scheduled task is small, channel scheduler 12 removes the task from the rate scheduling routine. Transmission of a small amount of data can be completed within a satisfactory time period over the primary code channel. Channel scheduler 12 only allocates resource, when necessary, for transmission of a large amount of data. Thus, the amount of resource allocated to each remote station is approximately proportional to the queue size of the data to be transmitted to remote station 6.

The type of data to be transmitted is another important consideration in assigning priority among remote stations 6. Some data types are time sensitive and require quick attention. Other data types can tolerate longer delays in transmission. Obviously, higher priority is assigned to data that is time critical.

As an example, inevitably, some of the transmitted data are received in error by remote station 6. Remote station 6 is able to determine a frame error by the use of the appended CRC bits in the received code channel frames. Upon determination that a code channel frame has been received in error, the error indicator bit (EIB) for that code channel frame is flagged and remote station 6 informs the cell of the frame error. The implementation and use of EIB transmission are disclosed in the aforementioned U.S. Pat. No. 5,568,483. Channel scheduler 12 then schedules the retransmission of the code channel frames received in error. At remote station 6, other signal processing may be dependent on the code channel frames received in error. Therefore, channel scheduler 12 places a higher priority on data being retransmitted than data being transmitted for the first time.

Conversely, repeated frame error indications by the same remote station 6 can indicate that the forward link is impaired. Therefore, allocating the forward link resource for repeated retransmission of the code channel frames received in error is wasteful. In this case, remote station 6 can be temporarily placed in the hold state. Data transmission at the high speed transmission rate can be suspended until the forward link condition improves. Channel scheduler 12 can still direct data transmission on the primary code channel and continuously monitor the performance of the forward link. Upon receiving indications that the forward link condition has improved, channel scheduler 12 removes remote station 6 from the hold state and resumes the high speed data transmission to remote station 6. Alternately, the data in the queue can be deleted after a predetermined number of unsuccessful attempts at retransmission.

In assigning priority among remote stations 6, it may be desirable to distinguish remote stations 6 according to the type of data service being provided. For example, a pricing structure can be established for different data transmission services. Higher priority is given to those services for which a premium price is charged. Through the pricing structure, the user on each remote station 6 can determine, individually, the priority and, therefore, the type of service the user will receive.

The priority of remote station 6 can also be made a function of the amount of delay already experienced by remote station 6. The available forward link resource is allocated first to remote station 6 having the highest priority. Consequently, remote station 6 having a low priority typically experiences longer transmission delay. As the amount of delay experienced by the low priority remote station 6 increases, the priority of remote station 6 can be upgraded. This prevents data directed to the low priority remote station 6 from remaining in the queue state indefinitely. Without the priority upgrade, the low priority remote station 6 can suffer an intolerable amount of delay. The priority upgrade can be incremented in a manner such that a high quality communication of the scheduled and unscheduled tasks are achieved, while the system goals are maintained.

The factors are given different weights, depending on the set of system goals being optimized. As an example, to maximize the throughput on the forward link, greater weight is given to the energy-per-bit required by remote station 6 and whether remote station 6 is in soft handoff. This weighting scheme does not take into account data types and the priority of remote stations 6, thereby not addressing the system goal of fairness.

Alternately, a pricing structure can be maintained which allows the user on each remote station 6 to determine, individually, the priority of remote station 6. The willingness to pay a premium fee for the resource indicates a higher level of importance. In this case, a system which attempts to maximize revenue and customer satisfaction can transmit first to the premium remote station 6 even though the transmission requires more resource. Other weighting schemes can also be generated using the factors listed above, plus other factors not discussed, to achieve any set of system goals, and are within the scope of the present invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for a communication system, comprising:
    assigning at a controller a primary code channel to transmit unscheduled transmissions of data and control messages without a delay over a forward channel; and
    assigning a secondary code channel for transmission of data at high rates over the forward channel, wherein said secondary code channel is reassigned during the scheduling period based on an available capacity of said forward link.

2. The method as recited in claim 1, further comprising:
    grouping said secondary code channel into sets of secondary code channels, with each set defined by a unique grouping of secondary code channels.

3. The method as recited in claim 1, further comprising:
    scheduling high speed data transmissions by allocating communication resources via selecting a set of secondary code channels.

4. The method as recited in claim 2, further comprising:
    wherein at least one of said unique grouping of secondary code channels corresponds to an assigned transmission rate.

5. The method as recited in claim 1, further comprising:
    partitioning transmitted data into data frames and each data frame partitioned into data portions for transmission on the primary and secondary code channels.

6. The method as recited in claim 5, further comprising:
    encoding and spreading said data portion into data frames of said primary and secondary code channels for transmission.

7. The method as recited in claim 1, further comprising:
    determining a demand for a transmit power level of the forward link,
    adding or dropping one or more secondary code channels to satisfy the demand for the transmit power level at each scheduling period.

8. The method as recited in claim 1, further comprising:
    receiving said primary and secondary code channels.

9. The method as recited in claim 1, further, comprising:
    scheduling said primary and secondary code channels transmissions based on an amount of data to be transmitted.

10. The method as recited in claim 1, further comprising:
    scheduling transmission of small amounts of data on the primary code channel.

11. The method as recited in claim 1, further comprising:
    scheduling transmission of larger amounts of data on the secondary code channel.

12. The method as recited in claim 1, further comprising:
    scheduling high data rate transmission on the secondary code channel.

13. The method as recited in claim 1, further comprising:
    scheduling said primary and secondary code channels transmissions based on at least one a transmit energy-per-bit required by a user for a requisite level of performance, an amount of data to be transmitted, a type of data to be transmitted, a type of data service being provided to the user, an amount of delay already experienced by the user, and priority of the users.

14. An apparatus for a communication system, comprising:
a transmitter for transmitting data over a primary and secondary code channels over a forward link;
a controller for assigning a primary code channel to transmit unscheduled transmissions of data and control messages without a delay over the forward link, for assigning a secondary code channel for transmission of data at high rates over the forward channel, wherein said secondary code channel is reassigned during the scheduling period based on an available capacity of said forward link.

15. The apparatus as recited in claim 14, wherein said controller is for grouping said least one secondary code channel into sets of secondary code channels, with each set defined by a unique grouping of secondary code channels.

16. The apparatus as recited in claim 14, wherein said controller is for scheduling high speed data transmissions by allocating communication resources via selecting a set of secondary code channels.

17. The apparatus as recited in claim 15 wherein at least one of said unique grouping of secondary code channels corresponds to an assigned transmission rate.

18. The apparatus as recited in claim 14, wherein said controller is for partitioning transmitted data into data frames and each data frame partitioned into data portions for transmission on the primary and secondary code channels.

19. The apparatus as recited in claim 18, wherein said transmitter is for encoding and spreading said data portion into data frames of said primary and secondary code channels for transmission.

20. The apparatus as recited in claim 14, wherein said controller is for determining a demand for a transmit power level of the forward link, and adding or dropping one or more secondary code channels to satisfy the demand for the transmit power level at each scheduling period.

21. The apparatus as recited in claim 14, further comprising:
a receiver for receiving said primary and secondary code channels.

22. The apparatus as recited in claim 14, wherein said controller is for scheduling said primary and secondary code channels transmissions based on an amount of data to be transmitted.

23. The apparatus as recited in claim 14, wherein said controller is for scheduling transmission of small amounts of data on the primary code channel.

24. The apparatus as recited in claim 14, wherein said controller is for scheduling transmission of larger amounts of data on the secondary code channel.

25. The apparatus as recited in claim 14, wherein said controller is for scheduling high data rate transmission on the secondary code channel.

26. The apparatus as recited in claim 14, wherein said controller is for scheduling said primary and secondary code channels transmissions based on at least one a transmit energy-per-bit required by a user for a requisite level of performance, an amount of data to be transmitted, a type of data to be transmitted, a type of data service being provided to the user, an amount of delay already experienced by the user, and priority of the users.

27. An apparatus for communication system, comprising:
means for assigning a primary code channel to transmit unscheduled transmissions of data and control messages without a delay over a forward channel; and
means for assigning a secondary code channel for transmission of data at high rates over the forward channel, wherein said secondary code channel is reassigned during the scheduling period based on an available capacity of said forward link.

* * * * *